United States Patent
Butler et al.

(10) Patent No.: US 12,021,872 B2
(45) Date of Patent: *Jun. 25, 2024

(54) SYSTEMS AND METHODS FOR PROVIDING ELECTRONIC ITEMS

(71) Applicant: Capital One Services, LLC, McLean, VA (US)

(72) Inventors: Taurean Butler, Richmond Hill, GA (US); Christine Berglund, Brooklyn, NY (US); Adam Vukich, Springfield, VA (US); Jessica Greenberg, New York, NY (US); Colin Hart, Arlington, VA (US); Mykhaylo Bulgakov, Arlington, VA (US); Jason Ji, Reston, VA (US); Kaylyn Gibilterra, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 652 days.

This patent is subject to a terminal disclaimer.

(21) Appl. No.: 17/313,420

(22) Filed: May 6, 2021

(65) Prior Publication Data

US 2021/0258320 A1    Aug. 19, 2021

Related U.S. Application Data

(63) Continuation-in-part of application No. 17/099,626, filed on Nov. 16, 2020, now Pat. No. 11,263,636, and
(Continued)

(51) Int. Cl.
*H04L 9/40*    (2022.01)
*G06Q 20/32*    (2012.01)
(Continued)

(52) U.S. Cl.
CPC ........... *H04L 63/102* (2013.01); *G06Q 20/32* (2013.01); *G06Q 20/342* (2013.01);
(Continued)

(58) Field of Classification Search
CPC . H04L 63/102; H04L 63/0428; H04L 63/083; H04L 63/0861; H04L 63/10;
(Continued)

(56) References Cited

U.S. PATENT DOCUMENTS

| | | |
|---|---|---|
| 5,338,043 A | 8/1994 | Rehm |
| 5,740,243 A | 4/1998 | Rehm |

(Continued)

FOREIGN PATENT DOCUMENTS

| | | |
|---|---|---|
| EP | 2829036 A1 | 1/2015 |
| WO | 2014120051 A1 | 8/2014 |

*Primary Examiner* — Darren B Schwartz
(74) *Attorney, Agent, or Firm* — TROUTMAN PEPPER HAMILTON SANDERS LLP; Christopher J. Forstner; John A. Morrissett

(57) ABSTRACT

A method for providing a locked electronic item includes receiving a selection of an electronic lock and the electronic item from a first computing device associated with a sender. The electronic lock includes a lock clue and a lock solution. The method includes determining an answer input field configuration that includes a number of input boxes and spaces that may be arranged to correspond to the lock solution. The method includes transmitting the lock clue and the input field configuration to a second computing device associated with a recipient for display by the second computing device and receiving an attempted lock solution from the second computing device. The method further includes transmitting the electronic item to the second computing device for display or use by the second computing device in response to determining that the attempted lock solution matches the lock solution.

20 Claims, 15 Drawing Sheets

Related U.S. Application Data a continuation-in-part of application No. 16/597,115, filed on Oct. 9, 2019, now Pat. No. 11,115,422, said application No. 17/099,626 is a continuation of application No. 16/450,330, filed on Jun. 24, 2019, now Pat. No. 10,839,398, said application No. 16/597,115 is a continuation of application No. 16/248,889, filed on Jan. 16, 2019, now Pat. No. 10,476,881, which is a continuation of application No. 16/014,523, filed on Jun. 21, 2018, now Pat. No. 10,218,708, and a continuation-in-part of application No. 16/014,454, filed on Jun. 21, 2018, now Pat. No. 11,004,057, said application No. 16/450,330 is a continuation of application No. 16/014,309, filed on Jun. 21, 2018, now Pat. No. 10,380,596.

(51) Int. Cl.
  *G06Q 20/34* (2012.01)
  *H04M 1/724* (2021.01)
  *H04M 1/72403* (2021.01)
  *H04M 1/72457* (2021.01)

(52) U.S. Cl.
  CPC ........ *H04L 63/0428* (2013.01); *H04L 63/083* (2013.01); *H04L 63/0861* (2013.01); *H04L 63/10* (2013.01); *H04M 1/724* (2021.01)

(58) Field of Classification Search
  CPC ..... G06Q 20/32; G06Q 20/342; H04M 1/724; H04M 1/72457; H04M 1/72403
  See application file for complete search history.

(56) References Cited

U.S. PATENT DOCUMENTS

| | | | |
|---|---|---|---|
| 6,193,155 B1 | 2/2001 | Walker et al. | |
| 8,577,356 B2 | 11/2013 | Kornilovsky et al. | |
| 8,755,824 B1 | 6/2014 | Wang et al. | |
| 8,819,812 B1 | 8/2014 | Weber et al. | |
| 8,850,603 B2 | 9/2014 | Methenitis | |
| 8,904,479 B1 | 12/2014 | Johansson et al. | |
| 8,904,502 B1 | 12/2014 | Koizumi | |
| 9,015,066 B2 | 4/2015 | Scipioni et al. | |
| 9,069,794 B1 | 6/2015 | Bandukwala et al. | |
| 9,183,554 B1 | 11/2015 | Courtright et al. | |
| 9,460,433 B2 | 10/2016 | Proctor, Jr. et al. | |
| 9,483,786 B2 | 11/2016 | Glass et al. | |
| 9,628,950 B1 | 4/2017 | Noeth et al. | |
| 9,773,104 B1 | 9/2017 | Valecha | |
| 9,919,215 B2 | 3/2018 | DeCoufle | |
| 9,985,943 B1 | 5/2018 | Reading et al. | |
| 10,380,596 B1 | 8/2019 | Butler et al. | |
| 10,410,207 B1 | 9/2019 | Butler et al. | |
| 2002/0022998 A1* | 2/2002 | Onoue ............... | G07F 17/3295 705/14.27 |
| 2003/0200184 A1 | 10/2003 | Dominguez et al. | |
| 2004/0030933 A1 | 2/2004 | Park | |
| 2004/0141649 A1 | 7/2004 | Landstad et al. | |
| 2004/0225880 A1 | 11/2004 | Mizrah | |
| 2005/0008148 A1 | 1/2005 | Jacobson | |
| 2005/0044425 A1 | 2/2005 | Hypponen | |
| 2005/0071686 A1 | 3/2005 | Bagga et al. | |
| 2005/0120201 A1 | 6/2005 | Behaloh et al. | |
| 2005/0149762 A1 | 7/2005 | Smith et al. | |
| 2005/0197919 A1 | 9/2005 | Robertson | |
| 2006/0020815 A1 | 1/2006 | Varghese et al. | |
| 2006/0084472 A1 | 4/2006 | Park | |
| 2007/0015490 A1 | 1/2007 | Munje et al. | |
| 2007/0130547 A1 | 6/2007 | Boillot | |
| 2007/0142106 A1 | 6/2007 | Proch et al. | |
| 2007/0250920 A1 | 10/2007 | Lindsay | |
| 2007/0277224 A1 | 11/2007 | Osborn et al. | |
| 2008/0010203 A1 | 1/2008 | Grant | |
| 2008/0024272 A1 | 1/2008 | Fiske | |
| 2008/0134317 A1 | 6/2008 | Boss et al. | |
| 2008/0140512 A1 | 6/2008 | Bruster | |
| 2008/0243702 A1 | 10/2008 | Hart et al. | |
| 2009/0037983 A1 | 2/2009 | Chiruvolu et al. | |
| 2009/0172810 A1 | 7/2009 | Won et al. | |
| 2009/0276839 A1 | 11/2009 | Peneder | |
| 2009/0291711 A1 | 11/2009 | Hsu | |
| 2010/0001787 A1 | 1/2010 | Hirakawa et al. | |
| 2010/0199100 A1 | 8/2010 | Goertzen | |
| 2010/0306055 A1 | 12/2010 | Kolb | |
| 2011/0053685 A1 | 3/2011 | Kim et al. | |
| 2011/0078788 A1 | 3/2011 | Takimoto | |
| 2011/0202762 A1 | 8/2011 | Hadad et al. | |
| 2011/0251962 A1 | 10/2011 | Hruska | |
| 2012/0046077 A1 | 2/2012 | Kim et al. | |
| 2012/0124654 A1 | 5/2012 | Senac | |
| 2012/0178073 A1 | 7/2012 | Wasmund | |
| 2012/0192252 A1 | 7/2012 | Kuo et al. | |
| 2012/0197794 A1 | 8/2012 | Grigg et al. | |
| 2012/0208612 A1 | 8/2012 | Baal | |
| 2012/0214442 A1 | 8/2012 | Crawford et al. | |
| 2012/0252410 A1 | 10/2012 | Williams | |
| 2013/0014248 A1 | 1/2013 | McLaughlin et al. | |
| 2013/0067566 A1 | 3/2013 | Oh | |
| 2013/0144732 A1 | 6/2013 | Rothschild | |
| 2013/0166445 A1 | 6/2013 | Isaacson et al. | |
| 2013/0167212 A1 | 6/2013 | Azar et al. | |
| 2013/0223696 A1 | 8/2013 | Azar et al. | |
| 2013/0227651 A1 | 8/2013 | Schultz et al. | |
| 2013/0254036 A1 | 9/2013 | Trinh et al. | |
| 2013/0268440 A1 | 10/2013 | Tierney et al. | |
| 2013/0339188 A1 | 12/2013 | Mohamed et al. | |
| 2014/0047527 A1 | 2/2014 | Ngo et al. | |
| 2014/0081761 A1 | 3/2014 | Singonahalli et al. | |
| 2014/0164159 A1 | 6/2014 | Lovelace | |
| 2014/0180817 A1 | 6/2014 | Zikha | |
| 2014/0189856 A1 | 7/2014 | Yoo | |
| 2014/0195425 A1 | 7/2014 | Campos et al. | |
| 2014/0214661 A1 | 7/2014 | Yankovich et al. | |
| 2014/0289870 A1 | 9/2014 | Selander et al. | |
| 2014/0310805 A1 | 10/2014 | Kandekar | |
| 2015/0058618 A1 | 2/2015 | Jung | |
| 2015/0269624 A1 | 9/2015 | Cheng et al. | |
| 2015/0339670 A1 | 11/2015 | Shaked et al. | |
| 2016/0021117 A1 | 1/2016 | Harmon et al. | |
| 2016/0042434 A1 | 2/2016 | Levitt et al. | |
| 2016/0371668 A1 | 12/2016 | Priebatsch et al. | |
| 2017/0011406 A1 | 1/2017 | Tunnell et al. | |
| 2017/0087448 A1 | 3/2017 | Poisner et al. | |
| 2017/0091753 A1 | 3/2017 | May | |
| 2017/0161781 A1 | 6/2017 | Parekh | |
| 2017/0171188 A1 | 6/2017 | Saito et al. | |
| 2018/0101841 A1 | 4/2018 | Kohli | |
| 2018/0165675 A1 | 6/2018 | Isaacson et al. | |
| 2018/0189769 A1 | 7/2018 | Narasimhan et al. | |
| 2018/0196963 A1 | 7/2018 | Bandiwdekar | |
| 2018/0247165 A1 | 8/2018 | Kim et al. | |
| 2018/0293573 A1 | 10/2018 | Ortiz et al. | |
| 2018/0336550 A1 | 11/2018 | Hewitt | |
| 2018/0365682 A1 | 12/2018 | Ball et al. | |

\* cited by examiner

SYSTEMS AND METHODS FOR PROVIDING ELECTRONIC ITEMS

CROSS REFERENCE TO RELATED APPLICATIONS

This application is a continuation-in-part of and claims priority under 35 U.S.C. § 120 to U.S. patent application Ser. No. 16/597,115, filed Oct. 9, 2019, which is a continuation of U.S. patent application Ser. No. 16/248,889, now U.S. Pat. No. 10,476,881, filed Jan. 16, 2019, which is a continuation of U.S. patent application Ser. No. 16/014,523, now U.S. Pat. No. 10,218,708, filed Jun. 21, 2018, the entire contents of which is incorporated herein by reference.

This application is also a continuation-in-part of and claims priority under 35 U.S.C. § 120 to U.S. patent application Ser. No. 16/014,454, filed Jun. 21, 2018, the entire contents of which is incorporated herein by reference.

This application is also a continuation-in-part of and claims priority under 35 U.S.C. § 120 to U.S. patent application Ser. No. 17/099,626, filed Nov. 16, 2020, which is a continuation of U.S. patent application Ser. No. 16/450,330, now U.S. Pat. No. 10,839,398, filed Jun. 24, 2019, which is a continuation of U.S. patent application Ser. No. 16/014,309, now U.S. Pat. No. 10,380,596, filed Jun. 21, 2018, the entire contents of which is incorporated herein by reference.

FIELD OF INVENTION

The present disclosure relates to systems and methods for providing a locked electronic item, and more particularly providing systems and methods for remotely providing an electronic item or gift having a customized locking mechanism that may be remotely modified by the sender to adjust the recipient's ability to unlock the locking mechanism.

The present disclosure also relates to systems and methods for providing a gift, and more particularly systems and methods for providing a location-activated gift having customized conditions that are enforced by the system prior to allowing redemption of the gift.

The present disclosure relates to systems and methods for providing a gift, and more particularly providing systems and methods for allowing a gift recipient to receive and use a tokenized primary account number (PAN) that is linked to a gifter's financial account and that is restricted by use conditions specified by the gifter.

BACKGROUND

Electronic locking mechanisms are often used to lock electronic devices. For example, it is common for smartphones and computers to include features that allow a user to password protect a device with, for example, a password, a pin, or a predefined swiping gesture. Similarly, password protection may also be applied to electronic files that may be transferred between users by attaching a static password to the file before sending it to the recipient. For example, a first user may apply a password to a PDF document that is then transmitted to a second user who may then access the contents of the PDF document by inputting the correct password. For each of these methods to work, it is necessary that the person attempting to access the electronically locked item have direct knowledge of the password required to access the item. However, it may be desirable to provide a system for password protecting a document in which the recipient does not have direct knowledge of the password required to access an electronically locked item that has been transferred from one person to another as a means of providing a degree of entertainment between users, but requiring the recipient to guess or figure out the solution to the locking mechanism. While it is possible to password protect a shared document and require that a recipient guess the password, this would likely to result in frustration as opposed to entertainment because a conventionally locked document may not provide any feedback to aid in the unlocking of the item. Therefore, it may be particularly desirable to provide a locking mechanism which enables remote, real-time connectivity to the sender in order to allow the sender to provide clues or adjustments to the locking mechanism. Such a locking mechanism may be particularly useful in relation to the transmission of an electronic gift, such as a gift card, where elements of entertainment and enjoyment are particularly relevant.

Accordingly, there is a need for improved systems that allow a gifter to provide an electronic gift (or other electronic item) that is secured from access by a customizable electronic locking mechanism that (i) provides real-time feedback to the gifter and (ii) allows the gifter to provide inputs, clues and adjustments in relation to the locking mechanism. Embodiments of the present disclosure are directed to this and other considerations.

Gift cards are a convenient means for people to provide a financial gift to one another that can be more personalized or allotted for a particular use than exchanging cash. To obtain a gift card, a purchaser typically pays an amount matching the desired value of the gift card (plus any gift card fees), receives the physical gift card, and provides it to the recipient for future use with one or more associated merchants that accept the card or for general use (similar to a credit card) depending on the type of gift card. While convenient, conventional gift cards often come with significant drawbacks. For example, conventional gift cards require that the purchaser spend the money to obtain the card before the money can be used by the recipient. Additionally, if the recipient only spends a portion of the value of the gift card or loses possession of the gift card, the recipient will not receive the full value that the gifter paid for the gift card, unnecessarily wasting some of the gifter's money. Furthermore, because conventional gift cards are either tied to specific merchants or available for general use (similar to a credit card), a gifter who wishes to give a customized gift for redemption from a particular merchant may find it unduly burdensome to hunt down a conventional gift card associated with that merchant, or may find that gift cards for the desired merchant do not exist. Further, before being redeemed, a conventional gift card must be transferred to the possession of the recipient so that the recipient may decide when and where to redeem the gift card, which prevents a gifter from including an element of surprise in association with a particular purchase. Accordingly, due to these limitations of conventional gift-giving, both the gifter and the gift recipient may lose out on the excitement that may be derived if, for example, the gift recipient received a gift upon arriving at a location at which the gift may be imminently used.

Accordingly, there is a need for improved systems that may allow a gifter to provide a location-activated, customized gift that may be used at any designated merchant that may be discerned via purchase authentication request data, and that does not require the gifter to spend money on the gift before the recipient redeems the gift. Embodiments of the present disclosure are directed to this and other considerations.

Gift cards are a convenient means for people to provide a financial gift to one another that can be more personalized or allotted for a particular use than exchanging cash. To obtain a gift card, a purchaser typically pays an amount matching the desired value of the gift card (plus any gift card fees), receives the physical gift card, and provides it to the recipient for future use with one or more associated merchants that accept the card or for general use (similar to a credit card) depending on the type of gift card. While convenient, conventional gift cards often come with significant drawbacks. For example, conventional gift cards require that the purchaser spend the money to obtain the card before the money can be used by the recipient. Additionally, if the recipient only spends a portion of the value of the gift card or loses possession of the gift card, the recipient will not receive the full value that the gifter paid for the gift card, unnecessarily wasting some of the gifter's money. Furthermore, because conventional gift cards are either tied to specific merchants or available for general use (similar to a credit card), a gifter who wishes to give a customized gift for redemption from a particular merchant may find it unduly burdensome to hunt down a conventional gift card associated with that merchant, or may find that gift cards for the desired merchant do not exist.

Accordingly, there is a need for improved systems that may allow a gifter to provide a financial gift having customizable redemption conditions that are enforced by the system and do not require that the gifter spend money on the gift before the recipient redeems the gift. Embodiments of the present disclosure are directed to this and other considerations.

SUMMARY

Disclosed embodiments provide systems and methods for providing a locked electronic item. In some embodiments the electronic item may be an electronic file (such as a word processing file, spreadsheet, PDF or the like), a data file, a text message, a digital image or video, an audio file, an address book contact file, an electronic giftcard, any other such type of file or item that may be electronically exchanged between users or even a subsequent digital experience (e.g., unlocking of features, functionality or content of an electronic item or software application).

Consistent with the disclosed embodiments, a method of providing a locked electronic item may include receiving, from a first computing device associated with a sender via a software application, a selection of an electronic lock and the electronic item. The electronic lock may include a lock clue and a lock solution. The method may include determining an answer input field configuration based on the lock solution. The answer input field configuration may include a number of input boxes and spaces that may be arranged to correspond to the lock solution. The method may include transmitting the lock clue and the input field configuration to a second computing device associated with a recipient for display by the second computing device. The method may include receiving an attempted lock solution comprising a set of alphanumeric characters equal to the number of input boxes and a spatial arrangement that corresponds to the input field configuration from the second computing device. The method may further include transmitting the electronic item to the second computing device for display or use by the second computing device in response to determining that the attempted lock solution matches the lock solution.

Consistent with the disclosed embodiments, systems and non-transitory computer-readable mediums for providing a locked electronic item are also disclosed.

Disclosed embodiments provide systems and methods for providing a gift. In some embodiments the gift may be a financial gift that may be provided electronically.

Consistent with the disclosed embodiments, a method of providing a gift may include receiving, from a first computing device associated with a gifter, gift information comprising data indicative of a maximum gift amount, a gift recipient, a gifter financial account that is associated with the gifter and gift redemption information. The method may include generating a tokenized primary account number (PAN) associated with the gifter financial account. The method may include identifying a second computing device, the second computing device being associated with the gift recipient based on the gift recipient. The method may include determining one or more gift redemption locations based on the gift redemption information. The method may further include receiving gift recipient location data. The method may include determining that the second computing device has entered a gift-eligible location based on the gift recipient location data and the one or more gift redemption locations. The method may include transmitting, to the second computing device, data indicative of a gift for display by the second computing device and the tokenized PAN. The method may further include outputting an instruction to debit the gifter financial account with an amount of money based on the transaction in response to determining that a transaction has been executed using the tokenized PAN at the gift-eligible location.

Consistent with the disclosed embodiments, systems and non-transitory computer-readable mediums for providing a gift are also disclosed.

Disclosed embodiments provide systems and methods for providing a gift. In some embodiments the gift may be a financial gift that may be provided electronically.

Consistent with the disclosed embodiments, a method of providing a gift may include receiving a gift token creation request from a first computing device. The gift token creation request may comprise data representative of a selection of a gift recipient and gift limitations comprising a maximum gift amount and one or more redemption merchants. The method may include generating, based on the gift token creation request, a tokenized primary account number (PAN) associated with a gift account. The gift account may be a financial account associated with a user of the first computing device. The method may include transmitting the tokenized PAN and data representative of the gift limitations to a second computing device associated with the gift recipient. The method may include detecting, based on monitoring of transaction authorization data originating from a plurality of merchant POS devices, a transaction authorization request that is representative of an attempted transaction at a merchant POS device. The transaction authorization request may comprise data representative of an attempted tokenized PAN, an attempted transaction amount and a merchant category code. The method may include determining that the attempted tokenized PAN matches the tokenized PAN associated with the gift account. The method may further include transmitting an authorization message to the merchant POS device in response to determining that the transaction authorization request satisfies the gift limitations. The authorization message may represent an authorization of the attempted purchase.

Consistent with the disclosed embodiments, systems and non-transitory computer-readable mediums for providing a gift are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
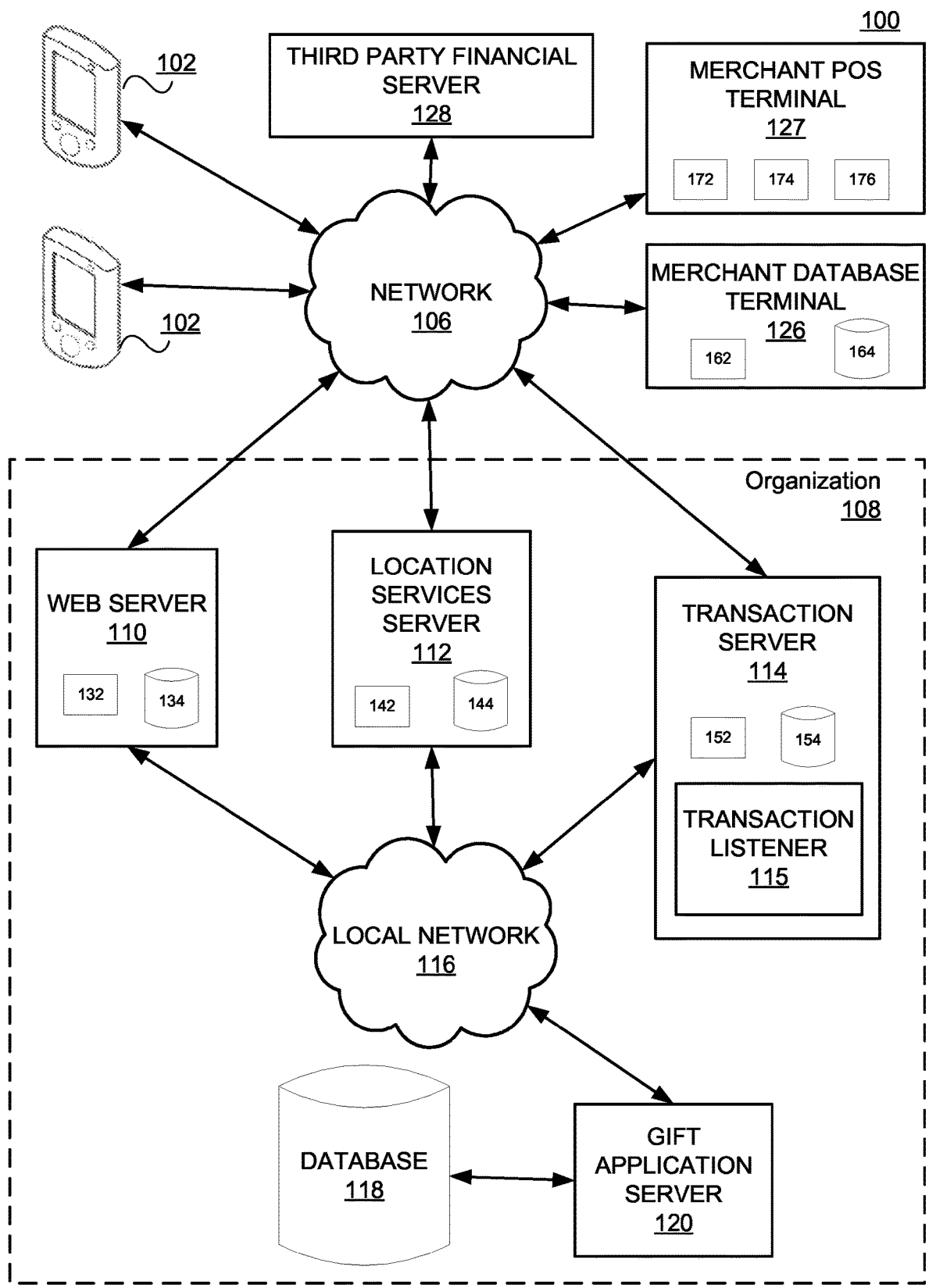
FIG. 1 is a diagram of an exemplary system that may be used to provide a locked electronic item.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to methods for providing a locked electronic item. In one embodiment, a method may include receiving, from a first computing device associated with a sender via a software application, a selection of an electronic lock and the electronic item. The electronic lock may include a lock clue and a lock solution. The method may include determining an answer input field configuration based on the lock solution. The answer input field configuration may include a number of input boxes and spaces that may be arranged to correspond to the lock solution. The method may include transmitting the lock clue and the input field configuration to a second computing device associated with a recipient for display by the second computing device. The method may include receiving an attempted lock solution comprising a set of alphanumeric characters equal to the number of input boxes and a spatial arrangement that corresponds to the input field configuration from the second computing device. The method may further include transmitting the electronic item to the second computing device for display or use by the second computing device in response to determining that the attempted lock solution matches the lock solution.

In another form, the present invention may be embodied in a method for providing a locked electronic item. The method may include receiving, from a computing device and via a software application, electronic lock data that may include a lock clue, an answer field configuration, and an indication of the electronic item. The method may include displaying the lock clue and a number of input boxes each configured to receive and display a single character. The number of input boxes and spacing of the input boxes may correspond to the answer field configuration. The method may include receiving, via a user input device, an attempted lock solution. The attempted lock solution may include a sequence of characters, wherein each character of the sequence of characters is input into one of the number of input boxes. The method may include transmitting the attempted lock solution to the computing device. The method may include receiving the electronic item from the computing device in response to the computing device determining that the attempted lock solution matches a lock solution stored by the computing device. The method may further include displaying a notification indicating receipt of the electronic item.

In another form, the present invention may be embodied in a method for providing a locked electronic item. The method may include receiving, from a first computing device associated with a sender via a software application, a selection of an electronic lock and the electronic item, wherein the electronic lock comprises a lock clue, a lock image and a lock solution. The lock solution may represent a trace path associated with a portion of the image. The method may include transmitting the lock clue and lock image to a second computing device associated with a recipient and for display by the second computing device. The method may include receiving an attempted lock solution comprising an attempted trace pattern from the second computing device. The attempted trace pattern may represent a user-input trace pattern made by a user of the second computing device by tracing a line over a portion of the image using a touchscreen associated with the second computing device. The method may further include transmitting the electronic item to the second computing device for display or use by the second computing device in response to determining that the attempted lock solution matches the lock solution within a predetermined confidence level.

In another embodiment, a system may include one or more memory devices storing instructions, and one or more processors configured to execute the instructions to perform steps of a method of providing a locked electronic item as disclosed herein.

In another embodiment, a non-transitory computer-readable medium is disclosed. The non-transitory computer-readable medium may store instructions that, when executed by one or more processors, cause a system to execute a method of providing a locked electronic item as disclosed herein.

The disclosed embodiments are directed to methods for providing a customized location-activated gift. In one embodiment, a method may include receiving, from a first computing device associated with a gifter, gift information comprising data indicative of a maximum gift amount, a gift recipient, and a gifter financial account that is associated with the gifter and gift redemption information. The method may include generating a tokenized primary account number (PAN) associated with the gifter financial account. The method may include identifying a second computing device, the second computing device being associated with the gift recipient based on the gift recipient. The method may include determining one or more gift redemption locations based on the gift redemption information. The method may further include receiving gift recipient location data. The method may include determining that the second computing device has entered a gift-eligible location based on the gift recipient location data and the one or more gift redemption locations. The method may include transmitting, to the second computing device, data indicative of a gift for display by the second computing device and the tokenized PAN. The method may further include outputting an instruction to debit the gifter financial account with an amount of money based on the transaction in response to determining that a transaction has been executed using the tokenized PAN at the gift-eligible location.

In another embodiment, a method for providing a customized location-activated gift is disclosed. The method may include receiving, from a first computing device associated with a gifter, gift information comprising data indicative of a maximum gift amount, a gift recipient, a gifter financial account, and gift redemption information. The gifter financial account may be a financial account associated with the gifter. The method may include identifying, based on the gift recipient, a second computing device and a recipient financial account. The second computing device and the recipient financial account may each be associated with the gift recipient. The method may include determining one or more gift redemption locations based on the gift redemption information. The method may include receiving gift recipient location data from the second computing device. The method may include determining, based on the gift recipient location data and the one or more gift redemption locations, that the second computing device has entered a gift-eligible location. The may further include transmitting data indicative of a gift for display by the second computing device to the second computing device. The method may further include outputting an instruction to initiate a transfer of an amount of money from the gifter financial account to the recipient financial account in response to detecting a transaction made at the gift-eligible location in association with the recipient financial account.

In another embodiment, a method for providing a customized location-activated gift is disclosed. The method may include registering a first computing device with a software application to associate the first computing device with a user account of a gift recipient. The method may include transmitting, from the first computing device to a second computing device, location data, wherein the location data is representative of a location of the first computing device. The method may include receiving, by the first computing device and from the second computing device, a gift notification and a tokenized primary account number (PAN) associated with a financial account, wherein the second computing device transmits the gift notification in response to determining that the location of the first computing device corresponds to a redemption merchant location based on the location data. The redemption merchant location may be selected by a gifter associated with the financial account. The method may include displaying, by the first computing device and based on the gift notification, an identification of the gifter, a gift amount and gift redemption information. The method may include conveying, by the first computing device and to a merchant POS device in association with an attempted transaction, the tokenized PAN to pay for at least a portion of the attempted transaction via the financial account, wherein the merchant POS device is associated with the redemption merchant. The method may include receiving, by the first computing device, a notification of the authorization of the attempted transaction. The method may further include adjusting a remaining balance associated with the tokenized PAN based on the notification of the authorization of the attempted transaction.

In another embodiment, a system may include one or more memory devices storing instructions, and one or more processors configured to execute the instructions to perform steps of a method of providing a customized location-activated gift as disclosed herein.

In another embodiment, a non-transitory computer-readable medium is disclosed. The non-transitory computer-readable medium may store instructions that, when executed by one or more processors, cause a system to execute a method of providing a customized location-activated gift as disclosed herein.

The disclosed embodiments are directed to methods for providing a gift. In one embodiment, a method may include providing a gift may include receiving a gift token creation request from a first computing device, such as mobile device of the gifter. The gift token creation request may include data representative of a selection of a gift recipient and gift limitations comprising a maximum gift amount and one or more redemption merchants, so that the gifter may specify the nature of the gift and the conditions of use. The method may include generating, based on the gift token creation request, a tokenized primary account number (PAN) associated with a gift account. The gift account may be a financial account associated with a user of the first computing device. The method may include transmitting the tokenized PAN and data representative of the gift limitations to a second computing device associated with the gift recipient. For example, the gift recipient may receive a notification on their mobile device indicating that they have received a gift and informing them of the nature of the gift. The method may include detecting, based on monitoring of transaction authorization data originating from a plurality of merchant POS devices, a transaction authorization request that is representative of an attempted transaction at a merchant POS device. The transaction authorization request may comprise data representative of an attempted tokenized PAN, an attempted transaction amount and a merchant code. The method may include determining that the attempted tokenized PAN matches the tokenized PAN associated with the gift account. In this way, the system may identify a transaction that is being made in association with the gift and determine if the attempted transaction qualifies for processing. So, for example, if the gift recipient receives a gift to a movie theater but attempts to redeem the gift at a restaurant, the system may reject the attempted transaction. The method may further include transmitting an authorization message to the merchant POS device in response to determining that the transaction authorization request satisfies the gift limitations. The authorization message may represent an authorization of the attempted purchase. In this way, the system can allow a gifter to provide a gift with customized characteristics, such as where and when the gift may be used, that will be enforced by the system so that the gifter will not be charged for gifts that go unused or gifts that are not used in accordance with the restrictions placed on the gift by the gifter. Further, by using transaction authorization request data to identify the merchant at which a gift is used, it may allow a user of the system to create a gift to a wide variety of merchants without requiring the merchant to be registered with the system, thereby allowing a user to create a customized gift to a merchant at which gifts may not otherwise be available for purchase.

In another embodiment, a method for providing a gift is disclosed. The method may include receiving a gift token issuance notification comprising a gift primary account number (PAN) associated with a gifter financial account and gift limitations. The gift limitations may comprise a maximum gift amount, a gift expiration date, and one or more redemption merchants. The method may include monitoring a plurality of transaction authorization requests. Each of the plurality of transaction authorization requests may comprise an attempted primary account number (PAN), an attempted transaction date, an attempted transaction amount and a merchant code. The method may include detecting, based on the monitoring of the plurality of transaction authorization requests, a gift transaction authorization request, wherein the gift transaction authorization request comprises an attempted PAN that matches the gift PAN associated with the gifter financial account and the gift transaction authorization request that is associated with an attempted transaction made at a merchant POS device. The method may include determining, based on the merchant code of the gift transaction authorization request, an identity of a merchant associated with the merchant POS device. The method may include generating a transaction authorization in response to determining that the identity of the merchant matches one of the one or more redemption merchants and an attempted transaction date associated with the gift transaction authorization request chronologically precedes the gift expiration date. The method may include transmitting the transaction authorization to the merchant POS device. The method may further include outputting instructions to debit the gifter financial account an amount equal to a gift amount.

In another embodiment, a method for providing a gift is disclosed. The method may include receiving a gift notification comprising data representative of a tokenized primary account number (PAN), a maximum gift amount and gift limitations. The gift limitations may include one or more redemption merchants representative of merchants at which the tokenized PAN is authorized to be used to make a purchase and a gift expiration date representative of the date upon which the tokenized PAN is no longer authorized to be used to make a purchase. The method may include storing the tokenized PAN and receiving a user input representative of a selection of the stored tokenized PAN as a payment method in association with a transaction. The method may include conveying the stored tokenized PAN to a merchant POS device in association with the transaction to pay for at least a portion of the transaction, wherein the merchant POS device is associated with one of the one or more redemption merchants and the transaction is made prior to the gift expiration date. The method may further include receiving a gift balance notification. The gift balance notification provides a remaining balance associated with the tokenized PAN.

In another embodiment, a system may include one or more memory devices storing instructions, and one or more processors configured to execute the instructions to perform steps of a method of providing a gift as disclosed herein.

In another embodiment, a non-transitory computer-readable medium is disclosed. The non-transitory computer-readable medium may store instructions that, when executed by one or more processors, cause a system to execute a method of providing a gift as disclosed herein.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may allow a first user of a first computing device to send an electronic gift that is secured by a user-specified customizable locking mechanism to a second user of a second computing device. For example, system 100 may be configured to allow a first user (who may be referred to as the "gifter") to send a financial gift to a second user (who may be referred to as the "gift recipient") that may be secured by a locking mechanism that may be specified by the gifter, such that the gift recipient may not access and/or use the financial gift until the gift recipient unlocks the locking mechanism by entering the proper lock solution. In some embodiments, system 100 may provide notifications to the gifter in response to user inputs made by the gift recipient on the gift recipient's device. For example, such notifications may include a notification of a successful attempt at inputting the proper lock solution, a notification of an incorrect attempt at entering the proper lock solution that may include data representative of the content of the incorrect attempt (e.g., an incorrect password entered by the gift recipient), a notification of a request for assistance made by the gift recipient, or other such notifications. In some embodiments, notifications may be provided to a device of the gifter via, for example push notifications, text messages, or notifications presented in a software application. According to some embodiments, system 100 may provide a connection between the gifter's device and the gift recipient's device so that the gifter may receive notifications in real-time. In some embodiments, a connection between the gifter's device and the gift recipient's device established by system 100 may allow the gifter to view the activity of the gift recipient with respect to the locking mechanism in real time. For example, in some embodiments, if the gift solution requires the gift recipient to input a drawing or trace pattern (e.g., via a stylus or swiping a touchscreen), a connection established by system 100 may allow the gifter to view the gift recipient's attempt to draw the image live. According to some embodiments, system 100 may be configured to allow the gifter to remotely provide updates to the locking mechanism, by for example, remotely unlocking the locking mechanism, filling in a portion of the lock solution, or reconfiguring the locking mechanism to require a different lock solution to be unlocked. According to some embodiments, system 100 may be configured to allow the gifter to create customized electronic gifts, such as a gift card to a particular merchant. In some embodiments, system 100 may enable the creation of customized gifts for a plurality of merchants based on monitoring of transaction authorization request data, such that customized gifts may be created for a given merchant without requiring the merchant to register with system 100.

System 100 may also be configured to perform one or more processes that may allow a user of a first computing device to create a customized location-activated gift to be automatically provided to a user of a second computing device upon the second computing device entering a designated location or area associated with the gift. According to some embodiments, activation of a gift may mean making the gift available for use by the gift recipient. System 100 may be configured to allow the first user (who may be referred to as the "gifter") to create a gift without making any payment for the gift until the gift is redeemed by the second user (who may be referred to as the "gift recipient"). System 100 may be configured to allow the gifter to specify one or more gift limitations or conditions that constrain the use of the gift, such as for example, a maximum gift amount that the redemption of the gift may not exceed, one or more redemption merchants (e.g., particular stores or vendors) or types of redemption merchants (e.g., restaurants, movie theaters, etc.) at which the gift is authorized to be redeemed, an expiration date by which the gift must be used before it expires, a condition that specifies use of the in association with card not present or card present transactions (i.e. whether or not the a payment card is present for the transaction), conditions on the number of uses of the gift (e.g., one-time use or multiple uses) or any other such types of conditions or limitations that may be created or enforced based on transaction authorization data or via administration of the gift mobile application. System 100 may determine one or more gift redemption locations based on the selected redemption merchants or types of merchants at which the gift may be redeemed. For example, if the gifter specifies that the gift may be redeemed at a particular chain of fast food restaurants, system 100 may determine a plurality of gift redemption locations where each gift redemption location corresponds to a particular restaurant of the chain of restaurants. System 100 may receive location data from a mobile device associated with the gift recipient and based on such location data may determine when the gift recipient has entered a redemption location. Upon determining that the gift recipient has entered a redemption location, system 100 may transmit data indicative of a gift for display by the mobile device of the gift recipient. According to some embodiments, system 100 may then authorize the gift for use in accordance with any conditions placed on the gift, such as the identification of the merchant, the maximum amount of the gift or the date and/or time of the redemption of the gift. In other words, in response to creation of the customized gift by the gifter, system 100 may monitor the location of the gift recipient and activate the gift for use upon determining that the gift recipient has entered a location associated with the gift. In this manner, the system may allow a gifter to surprise a gift recipient with a gift at a time and place where the gift recipient may be inclined to immediately take advantage of the gift. Further, system 100 may allow the gifter to provide customized gifts for merchants or types of merchants that may not require the merchant to preregister with system 100 by utilizing transaction authorization request data to enforce the conditions of the gift.

System 100 may be further configured to perform one or more processes that may allow a first user of a first computing device to send a customized financial gift comprising a tokenized primary account number (PAN) to second computing device for use by a second user. System 100 may be configured to allow the first user (who may be referred to as the "gifter") to send the financial gift without making any payment for the gift until the gift is redeemed by the second user (who may be referred to as the "gift recipient"). System 100 may be configured to allow the gifter to specify one or more gift limitations or conditions that may constrain the use of the gift, such as for example, a maximum gift amount that the redemption of the gift may not exceed, one or more redemption merchants (e.g., particular stores or vendors) or types of redemption merchants (e.g., restaurants, movie theaters, etc.) at which the gift is authorized to be redeemed, an expiration date by which the gift must be used before it expires, a condition that specifies use of the in association with card not present or card present transactions (i.e. whether or not the a payment card is present for the transaction), conditions on the number of uses of the gift (e.g., one-time use or multiple uses) or any other such types of conditions or limitations that may be created or enforced based on transaction authorization data or via administration of the gift mobile application. According to some embodiments, the gift recipient may receive and store the tokenized PAN on the second computing device for future use. In some embodiments, the tokenized PAN may be stored by, for example, a digital wallet associated with the second computing device. A stored tokenized PAN may be used to make a purchase in conjunction with electronic payment systems, such as, for example, a mobile payment system that uses near-field communication (NFC) to receive the tokenized PAN, a merchant terminal having an scanner or image capture device that may obtain an image or optical scan of an image of the tokenized PAN displayed by a screen of a user device, or a system that may receive a user input representative of the tokenized PAN via, for example, typed entry of the tokenized PAN into a keypad of the merchant terminal. According to some embodiments, upon detection by system 100 that the financial gift has partially or fully been redeemed, the system may debit a financial account of the first user with an amount corresponding to the redeemed gift. The components and arrangements shown in FIG. 1 are not intended to limit the disclosed embodiments as the components used to implement the disclosed processes and features may vary. As shown, system 100 may include a pair of user devices 102, a network 106, a merchant database terminal 126, a merchant POS terminal 127, a third party financial server 128, and an organization 108 including, for example, a web server 110, a location services server 112, a transaction server 114, a local network 116, a database 118 and a gift application server 120.

In some embodiments, a gifter and gift recipient may operate separate user devices 102, respectively. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. According to some embodiments, user device 102 may communicate with a merchant database terminal 126, merchant POS terminal 127 and/or third party financial server 128 via network 106. In some embodiments, user device 102 may include or incorporate electronic communication devices for hearing or vision impaired users. In some embodiments, one or more user devices 102 may include software that is configured to allow a user to generate and send a financial gift to another user (which may be herein referred to as the "gift mobile application").

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers. For example, in some embodiments, organization 108 may be associated with a financial services provider.

Organization 108 may include one or more servers, devices, and computer systems for performing one or more functions associated with products and/or services that organization 108 provides. Such servers, devices, and computer systems may include, for example, web server 110, location services server 112, transaction server 114, database 118 and gift application server 120, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118 and/or gift application server 120. According to some embodiments, web server 110 may be configured to transmit data and/or messages from a first user device 102 to a second user device 102, via for example, a mobile application that has been downloaded on one or both user devices 102.

Location services server 112 may include a computer system configured to track the location of user device 102 based on information and data received from user device 102. For example, location services server 112 may receive location data from user device 102, such as global positioning satellite (GPS) data comprising the coordinates of the device, RFID data of associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that when crossed by user device 102, may trigger system 100 to execute one or more actions. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle draw around the point at the specified radius. In some embodiments, a geofence may be specified by a user of system 100 by, for example, drawing the geofencing onto a virtual map or otherwise inputting the location of the geofence.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services server processor 142 may be used to determine the location of user device 102, whether user device 102 has crossed a particular geofence or whether user device 102 is inside or outside of an area designated by a particular geofence. As described below, according to some embodiments, system 100 may use geofences to represent a gift redemption location and/or a gift unlock location.

In some embodiments, location services server 112 may be configured send messages and/or data to other devices, such as for example, user device 102 or gift application server 120, upon determining that user device 102 has crossed a specified geofence or entered an area encompassed by a specified geofence. For example, in some embodiments, location services server 112 may send user device 102 a notification that the user of user device 102 has received a gift, and may provide, for example, the details of the gift, which in some embodiments may include a tokenized PAN. According to some embodiments, location services server 112 may receive data representative of a location that is associated with a gift. For example, gift application server 120 may provide data to location services server 112 representative of a location of a particular store that is associated with a particular gift. Location services server 112 may generate, receive or access geofence information associated with the received location and may monitor location data associated with the user device 102 of a designated gift recipient to determine when the user device 102 has entered the location. Location services server 112 may determine that user device has entered the location by determining that, for example, user device has crossed over the geofence associated with the gift. In this way, location services server 112 may determine when a gift recipient has entered a location or proximity to a redemption merchant specified by the gifter.

Transaction server 114 may include a computer system configured to process one or more transactions involving a financial account associated with a customer. For example, a transaction may be a purchase of goods or services from a merchant that is made in association with a financial account, such as a bank account or a credit card account. Transactions may be made at merchant POS terminal 127 by for example, swiping a credit card or making a payment using financial account information stored on a smartphone in a digital wallet. Such transactions may be made at merchant locations or at a merchant website via the internet. Transactions may be made using for example, a credit card, a debit card, a gift card, or other ways of conveying financial account numbers and/or account credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. According to some embodiments, transaction server 114 may store account numbers, such as primary account numbers (PANs) associated with credit/debit cards or other such financial account numbers, that may be used in transaction monitoring as described in greater detail below. Such account numbers may be associated with for example, financial accounts that are associated with the gift recipient or a tokenized PAN associated with a financial account of the gifter. According to some embodiments, a tokenized PAN may be a temporary PAN linked to an underlying financial account (e.g., the gifter's credit card account) that allows a user to make purchases against the financial account within predetermined limitations, such as at predetermined merchants, merchant categories, geographic areas or time periods. In some embodiments, transaction server 114 may store rules, conditions, restrictions or other such limitations that are associated with a gift and that may be applied to an attempted transaction to determine if the attempted transaction should be authorized and/or identified as a gift-eligible transaction.

According to some embodiments, transaction server 114 may receive transaction authorization data and/or requests from one or more merchant POS terminals 127 based on an attempted transaction made at a merchant. For example, if a purchaser swipes a credit card at card reader associated with merchant POS terminal 127 or types in a credit card number on a website to make a purchase, merchant POS terminal 127 may generate a transaction authorization request and transmit the transaction authorization request to transaction server 114. Such transaction authorization requests may include data indicative of a financial account (e.g., a PAN or account number) used to make a purchase, a time stamp, and merchant code associated with the merchant and/or location at which the attempted purchase was made. According to some embodiments, transaction server 114 may determine whether to authorize a transaction and/or whether the transaction is a gift-eligible transaction based on the transaction authorization request and any conditions or limitations associated with a gift that is associated with the transaction and the method of providing the gift. For example, in some embodiments, a gift may be provided to the gift recipient as a tokenized PAN that may be used as a payment method by the gift recipient at merchant POS terminal 127. In some embodiments, a gift may be provided to the gift recipient in the form of a funds transfer or reimbursement to a financial account of the gift recipient, in response to determining that a gift-eligible transaction was made using a financial account associated with the gift recipient. In either case, the associated gift may include conditions such as a specified redemption merchant or window of time at which the gift may be used. Thus, in some embodiments, transaction server 114 may identify attempted transactions made by the gift recipient based on monitoring transaction authorization data, and then may further determine whether the attempted transaction is authorized or designated as a gift-eligible transaction by applying the associated gift limitations to the data associated with the transaction authentication request. Attempted transactions that satisfy the associated gift limitations may be referred to as gift-eligible transactions.

In some embodiments, in response to authorizing a transaction, transaction server 114 may store a record of the transaction and update account information such as the balance of the account. Although the preceding description was made with respect to a credit card, it should be understood that other embodiments relating to other types of payment methods such as debit cards, gift cards, and any other such type of financial account, including online financial accounts, are contemplated as well.

According to some embodiments, transaction server 114 may determine the identity of a merchant associated with an attempted transaction based on the merchant category code (which may be referred to herein as a "merchant code") included in the transaction authorization data and/or other transaction authorization data such as the zip code and country code. For example, in some embodiments, transaction server 114 may be configured to determine the identity of the business, such as a particular chain of fast food restaurants, based on the merchant code. According to some embodiments, transaction server 114 may determine information about the merchant associated with a transaction such as the merchant's name, type/category of merchant, location, address and the like, by utilizing third party data and/or machine learning techniques to derive such information. According to some embodiments, transaction server 114 may be configured to determine one or more of a merchant description, a merchant name, a merchant location/address/zip code/country code based on a transaction ID associated with the transaction. In some embodiments, transaction server 114 may be configured to determine the location or address of the attempted purchase based on the merchant category code or other data provided with a transaction authorization request. According to some embodiments, if the identity of the merchant may not be determined solely based on the merchant category code, it may be determined based on the merchant category code in conjunction with the location information derived from the transaction authorization request. In some embodiments, transaction server 114 may be configured to determine the type of business at which the attempted transaction is made based on the merchant category code, such as whether the merchant is a restaurant, gas station, book store, movie theater or the like. In some embodiments, transaction server 114 may cleanse the raw transaction data and output transaction data that human readable. For example, transaction server 114 may receive transaction authorization data associated with a transaction that has a transaction ID of NCPI567 and may cleanse the transaction to output that the transaction took place at a restaurant called "Burger Joint" that is located at 123 Main Street. By using transaction authorization request data to identify the merchant at which a gift is used, system 100 may allow a gifter to create a customized gift to a wide variety of merchants without requiring the merchant to be registered with the system, thereby allowing a user to create a customized gift to a merchant at which gifts may not otherwise be available for purchase.

According to some embodiments, transaction server 114 may include a transaction listener 115 that may be configured to monitor transaction authorization data that originates from, for example, one or more merchant POS terminals or devices. According to some embodiments, transaction listener 115 may monitor incoming transaction authorization requests to identify attempted transactions that are associated with one or more stored account numbers of PANs. For example, for each attempted transaction, transaction listener 115 may compare a PAN/account number associated with the attempted transaction with a specified PAN/account number to identify all attempted transactions associated with the specified PAN/account number. For example, transaction listener 115 may identify one or more attempted transactions associated with a particular credit card account by monitoring transaction authorization request data to identify attempted transactions that were made in association with payment method associated with a PAN that matches the PAN of the specified credit card. According to some embodiments, transaction listener 115 may receive transaction authorization requests in real time if, for example, a financial account associated with the attempted payment method is part of a network associated with organization 108. In some embodiments, transaction listener 115 may receive a batch of transaction authorization requests at a particular time, such as at the end of the day, if, for example, the financial account associated with the attempted payment method is not part of a network associated with organization 108. Accordingly, in some embodiments, transaction listener 115 may monitor transaction authorization data in real time (or, in very close temporal proximity to when each attempted transaction is made), and in some embodiments transaction listener 115 may monitor transaction authorization data in batches at specified intervals, or some combination of both. In this way, transaction server 114 may be configured to monitor, identify and authorize or reject and/or classify as gift-eligible attempted transactions associated with a specified financial account in real time and/or intermittently at intervals.

According to some embodiments, transaction server 114 may be configured to send and/or initiate payments from a financial account in response to authorizing an attempted transaction associated with the account. For example, if transaction server 114 authorizes a particular transaction made using a specified financial account at a merchant, then transaction server 114 may generate an instruction to debit the specified financial account with the amount of the transaction and credit an account associated with the merchant with the same amount. In some embodiments, if transaction server 114 authorizes an attempted transaction associated with a tokenized PAN, then transaction server may initiate a payment from an account associated with the tokenized PAN (such as a financial account of the gifter) to a merchant at which the payment was made. According to some embodiments, transaction server 114 may initiate a funds transfer, such as an ACH transfer for example, from a financial account associated with a gifter to a financial account associated with a gift recipient upon detecting a gift-eligible transaction associated with an account of the gift recipient. According to some embodiments, if the funds are being transferred between two accounts that are both associated with an entity associated with organization 108, such transfers may occur instantaneously or substantially instantaneously. According to some embodiments, if one or more of the accounts involved in the transfer is not associated with an entity associated with organization 108, then transaction server may communicate with third party financial server 128 to carry out the transfer and there may be a delay of, for example, one or two business days in transferring the funds. In some embodiments, a funds transfer may alternatively include one or more of an account credit, a transfer of rewards points, or bill payments made to the gift recipient's credit card account.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, location services server 112, transaction server 114, or gift application server 120. Database 118 may be accessed by other devices and may be used to store records of every interaction, communication, and/or transaction a particular customer has had with organization 108 and/or its related entity. According to some embodiments, database 118 may store data associated with current or past gifts sent or received by users of system 100, such as for example, data identifying a sender of a gift, a receiver of a gift, an amount of a gift, an account designated to pay for the gift or to receive a reimbursement for the gift, the stores and/or types of stores that the gift is authorized to be redeemed at, electronic lock information associated with a gift, an expiration and/or an authorized usage date of a gift, and any other such information that may be pertinent to the provision of a gift.

Gift application server 120 may include a computer system configured to facilitate the creation and transmission of a locked electronic item, such as a customizable gift from a gifter that may be associated with a first user device 102 to a gift recipient that may be associated with a second user device 102. According to some embodiments, gift application server 120 may generate an electronic gift associated with a gifter financial account in response to receiving gift information via, for example, a software application running on user device 102. In some embodiments, gift application server 120 may associate an electronic lock with the gift such that the gift must be unlocked by the gift recipient prior to access or use. According to some embodiments, and electronic lock may include a lock clue and a lock solution that may be specified or selected by the gifter via, for example, gift mobile application 402 installed on gifter user device 102, as described in greater detail below.

In some embodiments, gift application server 120 may be configured to receive and/or generate a locked gift in response to user inputs received from the gifter's user device 102. According to some embodiments, gift application server 120 may cause an indication of the locked gift to be transmit to gift recipient's user device 102. For example, gift application server 120 may cause system 100 to send gift recipient's user device 120 a message indicating that a locked gift has been created for gift recipient and may provide data representative of the electronic lock and/or a lock clue for display by the gift recipient's user device 102. Upon system 100 determining that a correct lock solution has been input by the gift recipient, gift application server 120 may unlock the gift. According to some embodiments, unlocking the gift may include making some or all of the features of the gift (e.g., the identity of the gifter, the gift amount, the associated redemption merchant(s) and gift limitation(s)) available for display by the gift recipient's user device 102. In some embodiments, unlocking the gift may include making the gift available for use, by for example, transmitting or providing access to a tokenized PAN for use by the gift recipient or activating transaction monitoring with respect to one or more financial accounts of the gift recipient in the case where a gift may be provided by a funds transfer or reimbursement to an account of the gift recipient following a gift-eligible transaction made by the gift recipient. In some embodiments, successful use of an unlocked gift may be subject to the satisfaction of one or more conditions placed on the gift by the gifter, as described in greater detail below.

According to some embodiments, gift application server 120 may receive a gift creation request, that may include gift information and/or a gift token creation request, from user device 102 that is associated with the gifter. The gifter may, for example, specify features and conditions of the gift, that may include one or more of a selection of the gift recipient, a gift account that is associated with the gifter from which the funds for the gift may be taken from or debited against, a gift amount, one or more redemption merchants, one or more types of redemption merchants, one or more redemption locations, or a specified timeframe in which the gift must be redeemed. The gifter may also specify or select an electronic lock to be associated with the gift, by inputting or selecting a lock solution and a lock clue. In some embodiments, the gifter may specify other conditions relating to the electronic lock, such as a maximum number of unlock attempts after which the electronic lock may not be unlocked, additional clues that may be displayed by the gift recipient user device 102 upon the occurrence of some specified event (e.g., after 3 failed attempts at entering a lock solution or after a certain number of days has passed), an access date after or before which the electronic lock may no longer be unlocked, a gift unlock location representing a location at which the gift recipient or gift recipient's user device 102 must be present to unlock the gift, and one or more gift recipient verification requirements, such as a requirement that the gift recipient be positively identified by gift recipient user device 102 by comparing biometric data (e.g., fingerprint, facial image, voice recording, authenticating gestures, and the like) obtained by one or more sensors of gift recipient user device 102 with stored biometric data to verify the identity of the gift recipient before unlocking the gift or via multi-factor authentication by requiring the gift recipient to enter a one-time code generated by system 100 and sent to the gift recipient (e.g., via text message or email).

According to some embodiments, gift application server 120 may receive a gift creation request, including gift information or a gift token creation request, from user device 102 that is associated with the gifter. The gifter may, for example, specify features and conditions of the gift, that may include one or more of a selection of the gift recipient, a gift account that is associated with the gifter from which the funds for the gift will be taken from or debited against, a gift amount, one or more redemption merchants, one or more types of redemption merchants, one or more redemption locations, or a specified timeframe in which the gift must be redeemed. According to some embodiments, the selection of a gift recipient may be any information sufficient to identify an individual, such as a name, a username, a handle, a phone number, an address, an email address, or the like. In some embodiments, both the gifter and the gift recipient may have preregistered user accounts with a gift mobile application that may store financial account numbers of the respective users and may allow the gifter to easily identify and select the individual the gifter is designating as the gift recipient. According to some embodiments, based on the gift creation request, gift application server 120 may take steps to prepare a gift for use prior to activation of the gift. For example, in some embodiments, where the gift may be delivered in the form of a tokenized PAN sent to a device associated with the gift recipient, gift application server 120 may generate a tokenized PAN associated with to a specified account of the gifter to be authorized for use and/or transmitted to user device 102 of the gift recipient upon activation of the gift. In some embodiments, where the gift may be delivered in the form of a reimbursement made from a financial account of the gifter to a financial account of the gift recipient, gift application server 120 may identify one or more financial accounts of the gift recipient that may be used in transaction monitoring upon activation of the gift to determine if a particular transaction is gift-eligible.

According to some embodiments, in response to receiving a gift creation request, gift application server 120 may determine one or more gift redemption locations that correspond to locations of one or more merchants of types of merchants that are specified by the gift request. For example, if the gifter specifies that the gift is for a particular chain of movie theater, gift application server 120 may determine one or more gift redemption locations that correspond to locations of the specified chain of movie theaters. Alternatively, if the gifter specifies that the gift is for movie theaters generally, then application server 120 may determine one or more gift redemption locations that correspond to locations of any movie theater. In some embodiments, gift application server 120 may determine the gift redemption locations by accessing a stored a list of gift redemption locations that correspond to particular merchants and types of merchants. In some embodiments, gift application server 120 may determine the gift redemption location(s) by communicating with a merchant database terminal 126 to obtain the locations of merchant stores from the merchant directly. In some embodiments, gift application server 120 may determine the gift redemption location(s) by searching the internet to determine one or more addresses associated with the specified merchant or type of merchant, in a particular region for example. According to some embodiments, gift application server 120 may determine gift redemption locations that are within a predetermined distance of a location specified by the gifter (e.g., via a software application), a location of the gifter (as determined by location data received from gifter user device 102) or a location of the gift recipient (as determined by location data received from gift recipient user device 102). According to some embodiments, gift redemption locations may be defined by an area associated with a geofence, a coordinate or point on a map, or an area on a map that is defined by a radius extending from a point or coordinate on a map. According to some embodiments, a gift redemption location may be designated by the position of one or more devices or beacons associated with a merchant or merchant POS terminal 127. For example, a gift redemption location may be defined by a particular Wi-Fi network that is associated with a merchant POS terminal, such that when user device 102 connects to the Wi-Fi network, user device 102 may then be considered to be at the gift redemption location. In some embodiments, a gift redemption location may be defined by one or more beacons placed at a location that may be detectable by user device 102, via for example, detecting a radio frequency signal or the like. According to some embodiments, based on the detected signal beacon, user device 102 may be able to determine the identity of the location (e.g., a name of a store and/or an address) and an approximately how far away from the location user device 102 is.

According to some embodiments, after determining one or more gift redemption locations, gift application server 120 may monitor the location of gift recipient's user device 102 to determine if and when the gift recipient has entered the gift redemption location. Accordingly, in some embodiments, system 100 may receive location data from user device 102, such as for example, global positioning satellite (GPS) data or wireless access point connection information associated with the gift recipient user device 102. According to some embodiments, wireless access point connection data may include the location of one or more wireless access points, such as Wi-Fi routers, cellular telephone towers or any other such wireless transmitter that may be associated with a location. According to some embodiments, system 100 may determine the location of the gift recipient user device 102 by based on the locations of the one or more wireless access points by, for example, comparing the wireless access points that are visible to the gift recipient user device 102 to the known locations of the wireless access points. In some embodiments, system 100 may receive wireless access point information over time and may determine the location of the gift recipient user device 102 by performing triangulation of the signals and/or by tracking the change in signal strength of each wireless access point as detected by the gift recipient user device 102 over time. In some embodiments, gift recipient location data may include visual information obtained from an image capture device associated with the gift recipient user device 102, from which system 100 may determine the approximate location of user device 102 by, for example, performing image recognition on the image to identify a sign or landmark.

According to some embodiments, system 100 may prevent a gift that has not yet been activated from being redeemed. Thus, in some embodiments, upon determining that the gift recipient user device 102 has entered a gift redemption location, gift application server 120 may activate the associated gift so that it may be redeemed. In some embodiments, activating a gift may include transmitting a tokenized PAN to gift recipient user device 102 for use by the gift recipient and initiating of monitoring of transaction authorization data to identify a purchase made with the tokenized PAN in accordance with any specified gift limitations. In some embodiments, activating a gift may include initiating monitoring of transaction authorization data to identify a purchase made with a known financial account of the gift recipient in accordance with any specified gift limitations (i.e., a gift-eligible purchase) and initiating a funds transfer to reimburse the gift recipient from an account of the gifter for the cost of the gift-eligible purchase. In some embodiments, upon determining that the gift recipient user device 102 has entered a gift redemption location, gift application server 120 may cause system 100 to generate and send a notification to the gifter and/or gift recipient via for example, text message, email or through a mobile application installed on user device 102, to provide a notice that the gift has been activated and to provide details of the gift such as the gift amount and any limitations on the gift that were specified by the gifter. In this way, system 100 may allow a gifter to create a customized, location-activated gift that will only activate upon system 100 determining that gift recipient's user device 102 has entered a gift redemption location. Thus, system 100 may enable gifter to generate a surprise gift that may only be redeemed in accordance with limitations set by the gifter and at a location specified by the gifter. According to some embodiments, system 100 may be configured to allow gifter to specify a date before or after which the gift may not be activated. For example, a gifter may create a gift for use at a particular chain of movie theaters but may specify that the gift may not be activated until after a specified date, and so if the gift recipient visits one of the specified movie theaters prior to the specified date, the gift will not be activated, but may be activated in the future if the gift recipient visits one of the specified movie theaters after the specified date.

According to some embodiments, the selection of a gift recipient may be any information sufficient to identify an individual, such as a name, a username, a handle, a phone number, an address, an email address, or the like. In some embodiments, both the gifter and the gift recipient may have preregistered user accounts with a gift mobile application that may store financial account numbers of the respective users and may allow the gifter to easily identify and select the individual the gifter is designating as the gift recipient. According to some embodiments, based on the gift creation request, gift application server 120 may take steps to prepare a gift for use prior to activation of the gift. For example, in some embodiments, where the gift may be delivered in the form of a tokenized PAN sent to a device associated with the gift recipient, gift application server 120 may generate a tokenized PAN associated with to a specified account of the gifter to be authorized for use and/or transmitted to user device 102 of the gift recipient upon activation of the gift. In some embodiments, where the gift may be delivered in the form of a reimbursement made from a financial account of the gifter to a financial account of the gift recipient, gift application server 120 may identify one or more financial accounts of the gift recipient that may be used in transaction monitoring upon activation of the gift to determine if a particular transaction is gift-eligible.

According to some embodiments, in response to receiving a gift creation request, gift application server 120 may determine one or more gift redemption locations that correspond to locations of one or more merchants or types of merchants that are specified by the gift request. For example, if the gifter specifies that the gift is for a particular chain of movie theater, gift application server 120 may determine one or more gift redemption locations that correspond to locations of the specified chain of movie theaters. Alternatively, if the gifter specifies that the gift is for movie theaters generally, then application server 120 may determine one or more gift redemption locations that correspond to locations of any movie theater. According to some embodiments, in response to receiving a gift creation request, gift application server 120 may determine one or more gift unlock locations that correspond to locations at which the gift is authorized to be unlocked. For example, if the gifter specifies that a gift unlock location is a particular school, then the gift recipient (or by proxy the gift recipient user device 102) must be present at the school in order to attempt to unlock the electronic lock. In some embodiments, a gift redemption location and a gift unlock location may be the same. In some embodiments, a gift redemption location and a gift unlock location may be different. According to some embodiments, system 100 may be configured to allow gifter to specify that a portion of a single gift or one gift of a plurality of gifts is may be unlocked at different unlock locations. In some embodiments, a gifter may specify that the gift recipient's location may constitute a lock solution, such that a gift may be unlocked if system 100 determines that gift recipient's user device 102 has entered a specified gift unlock location. Accordingly, system 100 may allow a gifter set up a kind of scavenger hunt that may require a gift recipient to travel to various gift unlock locations in order to unlock the entirety of a single gift or a plurality of gifts.

In some embodiments, gift application server 120 may determine gift redemption locations by accessing a stored a list of gift redemption locations that correspond to particular merchants and types of merchants. In some embodiments, gift application server 120 may determine the gift redemption location(s) by communicating with a merchant database terminal 126 to obtain the locations of merchant stores from the merchant directly. In some embodiments, gift application server 120 may determine the gift redemption location(s) by searching the internet to determine one or more addresses associated with the specified merchant or type of merchant, in a particular region for example. According to some embodiments, gift application server 120 may determine gift redemption locations that are within a predetermined distance of a location specified by the gifter (e.g., via a software application), a location of the gifter (as determined by location data received from gifter user device 102) or a location of the gift recipient (as determined by location data received from gift recipient user device 102). According to some embodiments, gift redemption locations and/or gift unlock locations may be defined by an area associated with a geofence, a coordinate or point on a map, or an area on a map that is defined by a radius extending from a point or coordinate on a map. According to some embodiments, a gift redemption location and/or gift unlock location may be designated by the position of one or more devices or beacons associated with a merchant or merchant POS terminal 127. For example, a gift redemption location and/or gift unlock location may be defined by a particular Wi-Fi network that is associated with a merchant POS terminal, such that when user device 102 connects to the Wi-Fi network, user device 102 may then be considered to be at the gift redemption location and/or gift unlock location. Further, in some embodiments, location data of a gift recipient may be obtained from a third party service, such a social networking account in which the gift recipient has "checked in" at a location to indicate the user's presence at a location or if another user has tagged the gift recipient at the location in an image or post on a social media service.

According to some embodiments, gift application server 120 may monitor the location of gift recipient's user device 102 to determine if and when the gift recipient has entered a gift redemption location and/or gift unlock location. Accordingly, in some embodiments, system 100 may receive location data from user device 102, such as for example, global positioning satellite (GPS) data or wireless access point connection information associated with the gift recipient user device 102. According to some embodiments, wireless access point connection data may include the location of one or more wireless access points, such as Wi-Fi routers, cellular telephone towers or any other such wireless transmitter that may be associated with a location. According to some embodiments, system 100 may determine the location of the gift recipient user device 102 by based on the locations of the one or more wireless access points by, for example, comparing the wireless access points that are visible to the gift recipient user device 102 to the known locations of the wireless access points. In some embodiments, system 100 may receive wireless access point information over time and may determine the location of the gift recipient user device 102 by performing triangulation of the signals and/or by tracking the change in signal strength of each wireless access point as detected by the gift recipient user device 102 over time. In some embodiments, gift recipient location data may include visual information obtained from an image capture device associated with the gift recipient user device 102, from which system 100 may determine the approximate location of user device 102 by, for example, performing image recognition on the image to identify a sign or landmark.

According to some embodiments, system 100 may prevent a gift that has not yet been activated or unlocked from being redeemed. Thus, in some embodiments, upon determining that the gift recipient user device 102 has entered a gift redemption location and/or that the correct lock solution has been input to unlock the electronic lock, gift application server 120 may activate and/or unlock the associated gift so that it may be redeemed. In some embodiments, activating and/or unlocking a gift may include transmitting a tokenized PAN to gift recipient user device 102 for use by the gift recipient and initiating of monitoring of transaction authorization data to identify a purchase made with the tokenized PAN in accordance with any specified gift limitations. In some embodiments, activating and/or unlocking a gift may include initiating monitoring of transaction authorization data to identify a purchase made with a known financial account of the gift recipient in accordance with any specified gift limitations (i.e., a gift-eligible purchase) and initiating a funds transfer to reimburse the gift recipient from an account of the gifter for the cost of the gift-eligible purchase. In some embodiments, upon determining that the gift recipient user device 102 has entered a gift redemption location and/or gift unlock location, gift application server 120 may cause system 100 to generate and send a notification to the gifter and/or gift recipient via for example, text message, email or through a mobile application installed on user device 102, to provide a notice that the gift has been activated or is available to be unlocked, respectively, and may provide details of the gift such as the gift amount and any limitations on the gift that were specified by the gifter. In this way, system 100 may allow a gifter to create a customized, electronically locked, location-activated gift that may only be used upon system 100 determining that gift recipient's user device 102 has entered a gift redemption location to activate the gift and that the correct lock solution has been entered to unlock the gift. According to some embodiments, system 100 may be configured to allow gifter to specify a date before or after which the gift may not be activated and/or unlocked. For example, a gifter may create a gift for use at a particular chain of movie theaters but may specify that the gift may not be activated and/or unlocked until after a specified date, and so if the gift recipient visits one of the specified movie theaters prior to the specified date, the gift will not be activated or made available to be unlocked, but it may be activated or unlocked in the future if the gift recipient visits one of the specified movie theaters after the specified date.

In some embodiments, gift application server 120 may receive data from gift recipient user device 102 that is representative of an attempted lock solution input by the gift recipient. Gift application server 120 may compare the attempted lock solution to a stored location solution that is associated with the gift to determine if the correct lock solution has been entered. In some embodiments, gift application server 120 may provide notifications to the gifter user device 102 and/or the gift recipient user device 102 representative of a gift recipient's attempts to unlock the gift. In some embodiments, gift application server 120 may transmit the gift solution to gift recipient user device 102 and gift recipient user device 102 may perform the function of determining whether a correct lock solution has been input. In some embodiments, gift application server 120 may receive data from gifter user device 102 representative instructions to permanently lock, unlock, or modify an electronic lock displayed by gift recipient user device 102. For example, in some embodiments, the gifter may monitor the gift recipients attempts to unlock the gift and may determine after several unsuccessful attempts that a lock clue associated with the electronic lock does not provide enough information to the gift recipient to reasonably figure out the lock solution, in which case the gifter may update the lock clue (e.g., via gift mobile application) and gift application server 120 may receive the update from the gifter user device 102 and transmit the update to the gift recipient user device to modify the gift clue. In some embodiments, system 100 may allow the gifter to input a portion of the gift solution to be displayed by the gift recipient user device 102 to aid the gift recipient in determining the correct lock solution. In some embodiments, system 100 may allow gifter to remotely unlock the gift via a user input to, for example, gift mobile application 402.

Gift application server 120 may include a computer system configured to facilitate the purchase and sending of a gift from a gifter that may be associated with a first user device 102 to a gift recipient that may be associated with a second user device 102. According to some embodiments, gift application server 120 may generate an electronic gift associated with a gifter financial account in response to receiving gift information via, for example, a software application running on user device 102.

For example, gift application server 120 may receive a gift token creation request from user device 102 associated with a gifter. In some embodiments, a gift token creation request may comprise data representative of a selection of a gift recipient and gift limitations. According to some embodiments, the selection of a gift recipient may be any information sufficient to identify an individual, such as a name, a username, a handle, a phone number, an address, an email address, or the like. According to some embodiments, gift limitations may be restrictions on use of the gift that are specified by the gifter, such as a maximum gift amount, one or more redemption merchants (e.g., a particular business or chain of stores) at which the gift may be redeemed, one or more types of merchants (e.g., restaurants, movie theaters, etc.) at which the gift may be used, one or more geographic locations at which the gift may be used, date and time restrictions on use, and the like. In some embodiments, a gift token creation request may include an identification of a financial account associated with the gifter, which may be referred to as a gift account, from which the funds for the gift may ultimately be drawn. Gift application server 120 may generate a tokenized PAN that is associated with the gift account. According to some embodiments, a tokenized PAN may be a PAN that enables transactions to be made on an underlying account but that may be subject to certain rules and limitations. For example, if the gifter has a credit card having a PAN of 1234-5678-9999-1111 that is associated with an account number (i.e., a financial account), then gift application server may create a tokenized PAN of, for example, 1234-5678-9999-2222 that is associated with the same underlying account number. Accordingly, the tokenized PAN may have a different number than the PAN associated with the credit card, but may be linked to the credit card PAN by gift application server 120 such that if a transaction is processed using the tokenized PAN, the amount will be debited to the financial account associated with the credit card. According to some embodiments, gift application server 120 may transmit the tokenized PAN and any associated gift limitations to transaction server 114 for monitoring/authorization and to user device 102 associated with the gift recipient for future use of the gift. According to some embodiments, gift application server 120 may, for example upon receiving a notification from transaction server 114 that the gift has been successfully used, generate and transmit a message to user device 102 associated with the gifter to notify the gifter that gift was used and provide details such as the amount spent, the time, date, and location/merchant at which the gift was used.

Merchant database terminal 126 may have one or more processors 162 and one or more merchant databases 164, which may be any suitable repository of merchant data. Merchant database terminal 126 may be located at the POS location, off-site at another merchant location, or at a third-party location. Information stored in merchant database terminal 126 may be accessed (e.g., retrieved, updated, and added to) via network 106 by one or more devices (e.g., service provider terminal 110) of system 100. In other embodiments, merchant POS terminal 127 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services that identifies the location(s) that a particular product or service is available for purchase. In some embodiments, the location information may include an identification of a particular store, terminal, or kiosk that the product or service may be purchased from.

Merchant POS terminal 127 may have one or more POS devices 172, 174, 176 that communicate with one or more devices (e.g., user device 102) of system 100 via network 106. In some embodiments, POS devices 172, 174, 176 may devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 127 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip imbedded in the card or reading information from a magnetic strip), or a keypad for receiving a user input representative of payment information (e.g., a typed credit card number).

Third party financial server 128 may include a computer system configured to store information related financial accounts, such as checking accounts, savings accounts, credit cards accounts, and the like. For example, third party financial server 128 may store account numbers, PANs, balances, transaction data, fund transfer information, and user account information. According to some embodiments, a gifter and/or a gift recipient may have one or more financial accounts associated with third party financial server. In some embodiments, transaction server 114 and/or gift application server 120 may be configured to send instructions to third party financial server 128 via network 106 to cause third party financial server 128 to debit a financial account associated with third party financial server 128 or initiate a transfer of funds between financial accounts, such as an account of the gifter and an account of the gift recipient (such debit or credit constituting the gift). Accordingly, in some embodiments, gift application server 120 may store login credentials of financial accounts associated with the gifter and/or gift recipient and transmit such credentials to third party financial server 128 as necessary to initiate such transactions.

Although the preceding description describes various functions of a web server 110, location services server 112, transaction server 114, database 118, gift application server 120, merchant database terminal 126, merchant POS terminal 127 and third party financial server 128, in some embodiments, some or all of these functions may be carried out by a single computing device. For example, some or all of the functions of web server 110, location services server 112, transaction server 114, database 118 and gift application server 120 may be carried out by a single device.

For ease of discussion, embodiments may be described in connection with use of a mobile application on a mobile device to create, customize, send and receive, and in particular, gifts with customized locking mechanisms that may be redeemed at specified merchants. It is to be understood, however, that disclosed embodiments are not limited to use of sending gifts with customized locks, but also contemplate the sending of custom-locked messages, files, data, images, animations, video, an "emoji bomb" that showers emojis or other images on the display screen of the gift recipient user device 102 upon receiving, opening or activating a gift, or other additional such features or other media files. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high level code that can be executed by a processor using an interpreter.

Figure 2:
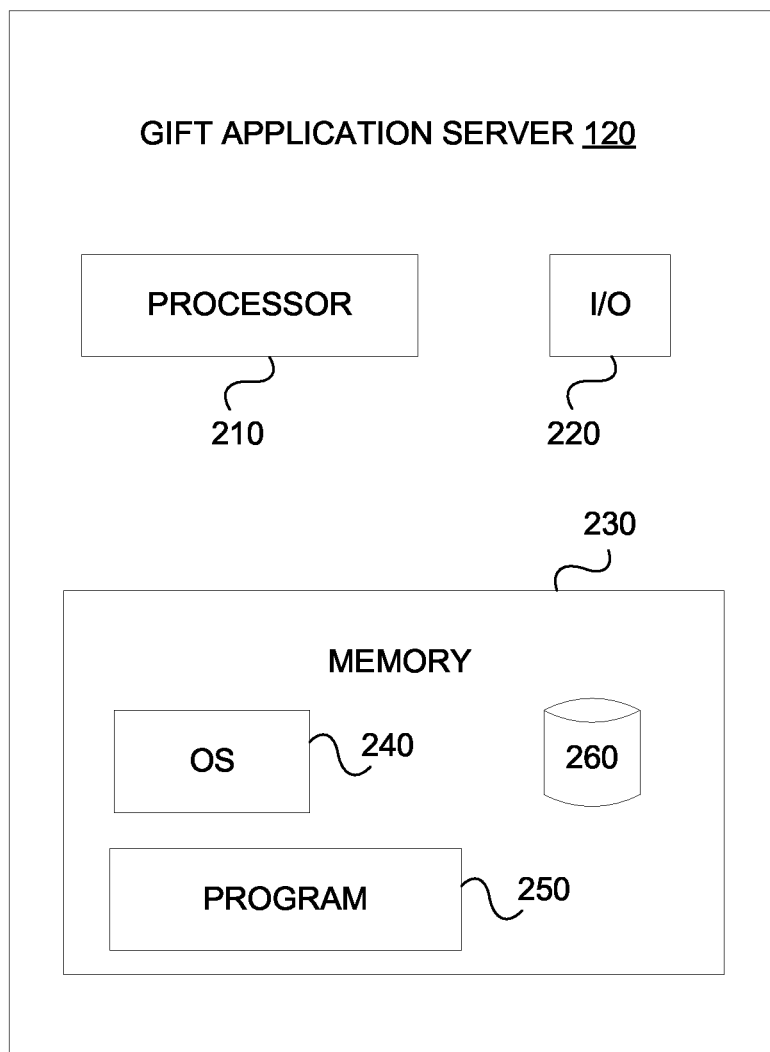
FIG. 2 is a component diagram of an exemplary gift application server.

An exemplary embodiment of gift application server 120 is shown in more detail in FIG. 2. Web server 110, location services server 112, transaction server 114, merchant database terminal 126, merchant POS terminal 127, third party financial server 128 and/or user device 102 may have a similar structure and may include many components that are similar to or even have the same capabilities as those described with respect to gift application server 120. As shown, gift application server 120 may include a processor 210, an input/output ("I/O") device 220, a memory 230 containing an operating system ("OS") 240 and a program 250. For example, gift application server 120 may be a single device or server or may be configured as a distributed computer system including multiple servers, devices, or computers that interoperate to perform one or more of the processes and functionalities associated with the disclosed embodiments. In some embodiments, gift application server 120 may further include a peripheral interface, a transceiver, a mobile network interface in communication with the processor 210, a bus configured to facilitate communication between the various components of gift application server 120, and a power source configured to power one or more components of gift application server 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Gift application server 120 may include one or more storage devices configured to store information used by processor 210 (or other components) to perform certain functions related to the disclosed embodiments. In some embodiments, gift application server 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, gift application server 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, gift application server 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, gift application server 120 may include a program that when executed, processes a request from a gifter to provide a gift to a gift recipient and creates, provides and administers the gift as disclosed herein.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable gift application server 120 to perform one or more of the processes and functionalities associated with the disclosed embodiments.

Gift application server 120 may also be communicatively connected to one or more memory devices (e.g., databases) locally or through a network. The remote memory devices may be configured to store information and may be accessed and/or managed by CSR terminal 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

Gift application server 120 may also include one or more I/O devices 220 that may comprise one or more interfaces for receiving signals or input from devices and providing signals or output to one or more devices that allow data to be received and/or transmitted by gift application server 120. For example, gift application server 120 may include interface components, which may provide interfaces to one or more input devices, such as one or more keyboards, mouse devices, touch screens, track pads, trackballs, scroll wheels, digital cameras, microphones, sensors, and the like, that enable gift application server 120 to receive data from one or more users. Gift application server 120 may include a display, a screen, a touchpad, or the like for displaying images, videos, data, or other information.

In exemplary embodiments of the disclosed technology, gift application server 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 3:
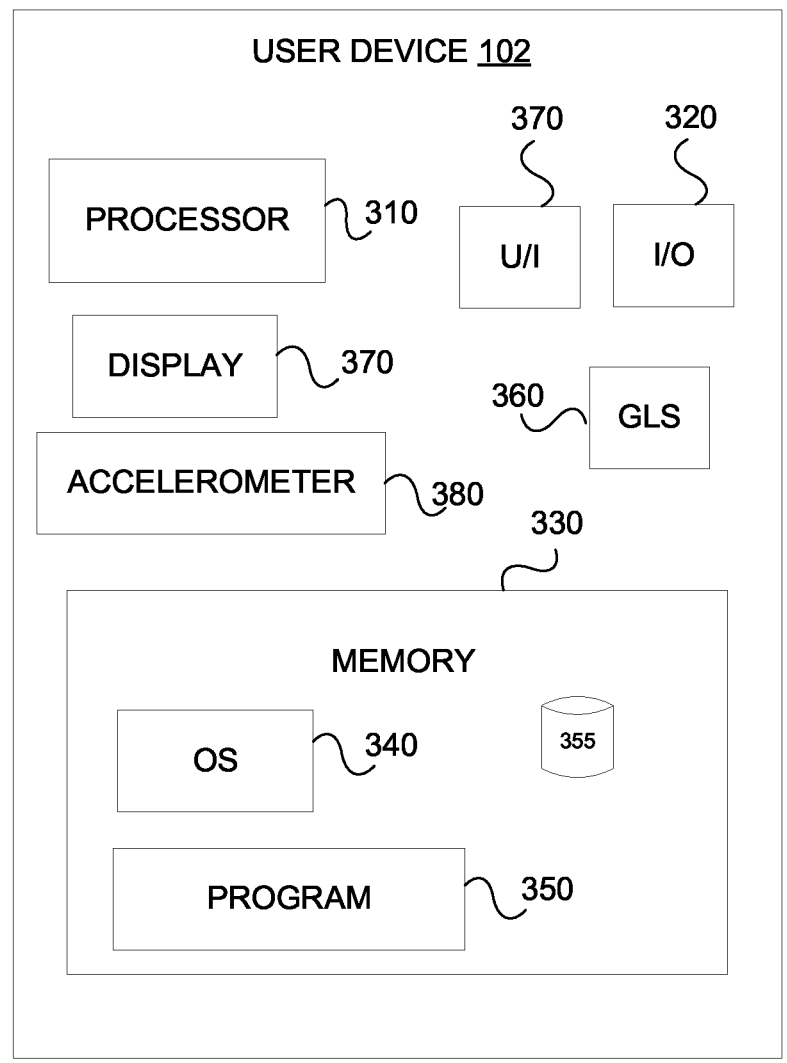
FIG. 3 is a component diagram of an exemplary user device.

FIG. 3 shows an example embodiment of user device 102. As shown, user device 102 may include a processor 310; an input/output ("I/O") device 320; a memory 330 containing an operating system ("OS") 340, a database 355, which may be any suitable repository of data, which may include a digital wallet for storing digital gifts and payment information, and/or a program 350; a geographic location sensor ("GLS") 360 for determining the geographic location of user device 102; a user interface ("U/I") device 370 for receiving user input data, such as data representative of a click, a scroll, a tap, a press, or typing on an input device that can detect tactile inputs; a gyroscope and/or an accelerometer 380 and/or any other sensor configured to detect motion of user device 102; and/or a display 390 for displaying digital images and/or video. As described in greater detail below, in some embodiments, program 350 may include a gift mobile application that may be a software application configured to run on user device 102. According to some embodiments, the gift mobile application may allow users to create, customize, send and receive locked electronic gifts as described further herein. In some embodiments, user input data may include biometric data associated with a user of user device 102 obtained by one or more sensors, such as a fingerprint scanner, a microphone, an image capture device, and the like. According to some embodiments, biometric data may be used to authenticate a user prior to creating, customizing, sending or utilizing an electronic gift. For example, in some embodiments, the gift mobile application may require a user to authenticate themselves using, for example, fingerprint data obtained from a fingerprint scanner of user device 102 prior to sending or using an electronic gift. It will be understood that other such authentication methods such as facial recognition, voice recognition, gesture recognition, username/password login, multi-factor authentication (e.g., sending a user an authentication code via an email or text message) and the like may also be used in a similar manner. In some embodiments, I/O device 320 may include a transceiver for sending and receiving wireless signals, such as Wi-Fi, cellular, Bluetooth, near-field communication, and any other such type of signal. In some embodiments, user device 102 may further include a peripheral interface, a mobile network interface in communication with processor 310, a bus configured to facilitate communication between the various components of user device 102, and/or a power source configured to power one or more components of user device 102. According to some embodiment, electronic gifts may be transmitted and stored using standard encryption techniques to add additional security. The various components of user device 102 may include the same or similar attributes or capabilities of the same or similar components discussed with respect to gift application server 120.

Figure 4B:
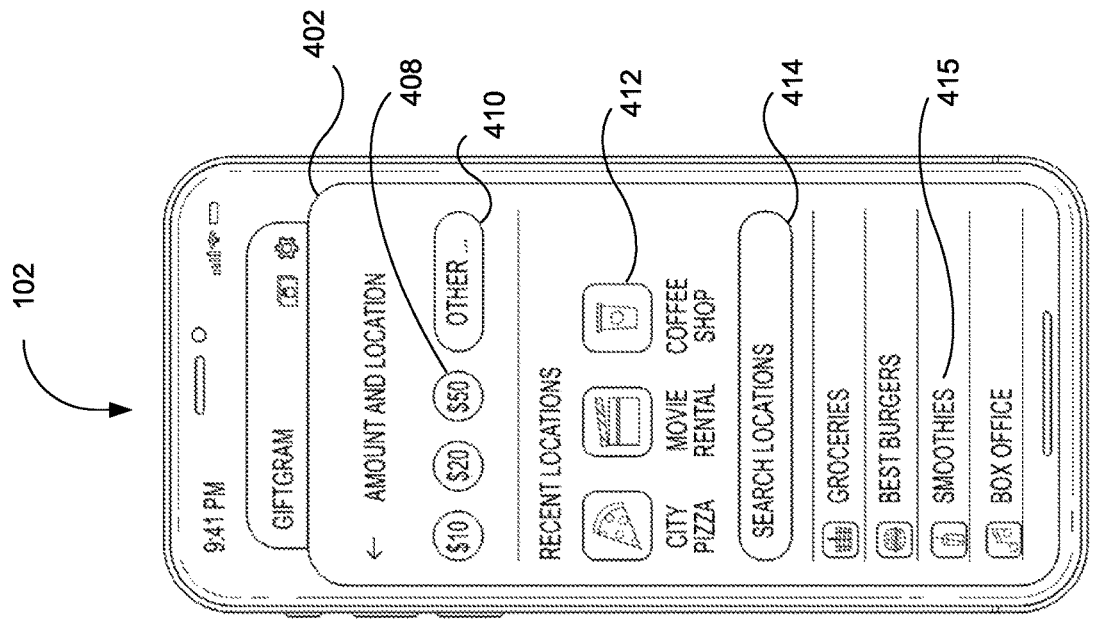
FIG. 4A and FIG. 4B are exemplary embodiments of user interfaces of a software application for providing gifts that may be secured by a customizable electronic locking mechanism.
Figure 4A:
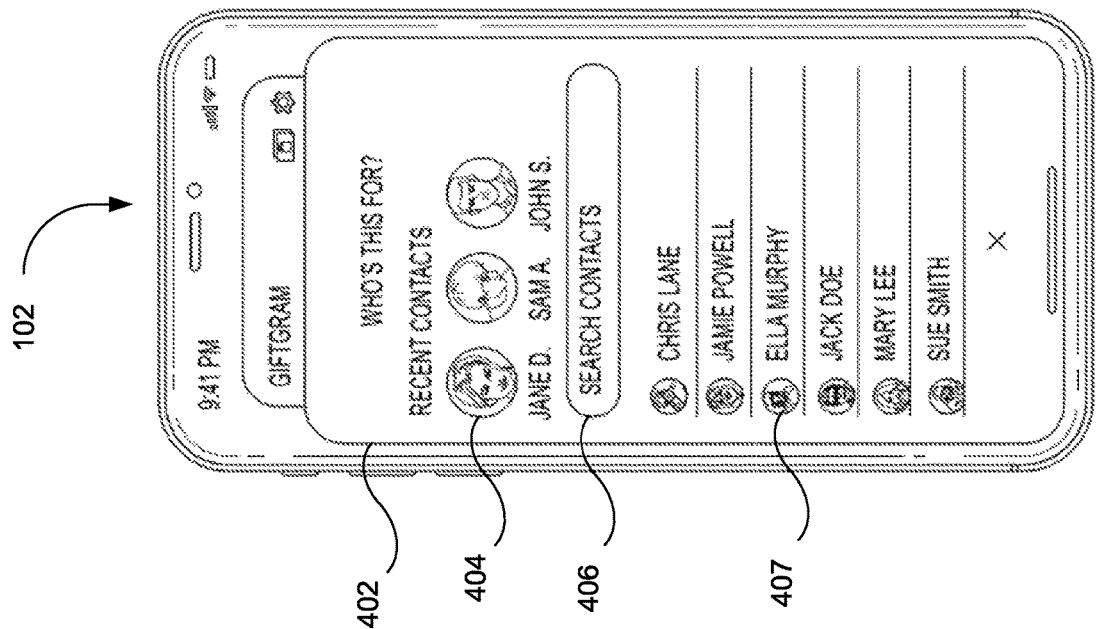

FIGS. 4A-B show example embodiments of user interfaces of a gift mobile application 402 being run on user device 102. According to some embodiments, gift mobile application 402 may be a software application that is configured to allow a gifter to create, customize and send a gift to a selected gift recipient using a first user device 102. According to some embodiments, a gift recipient may have a second user device 102 that may receive a gift sent by the gifter. In some embodiments, second user device 102 may receive the gift via gift mobile application 402 that is installed on second user device 102. In some embodiments, second user device 102 may not have gift mobile application 402 installed, but may be configured to receive the gift via, for example, an email or a text message. FIG. 4A shows an example embodiment of a user interface of gift mobile application 402 that is configured to allow a gifter to select a gift recipient and FIG. 4B shows an example embodiment of a user interface of gift mobile application 402 that is configured to allow a gifter to select and configure a gift to send to the selected gift recipient. According to some embodiments, gift mobile application 402 may facilitate communication between user device 102 and gift application server 120. In some embodiments, gift mobile application 402 may facilitate communication or the sending of messages between gifter user device 102 and gift recipient user device 102. For example, gift mobile application 402 may enable the gift recipient to record and send a thank you message to the gifter, or in some embodiments may initiate a telephonic or video link between gifter user device 102 and gift recipient user device 102 upon the gift recipient receiving or using the gift. According to some embodiments, if a telephonic or video link cannot be established immediately (e.g., due to a user being out of cell tower range), mobile application 402 may automatically attempt to establish the link upon detecting a user device 102 has reconnected to a network (e.g., Wi-Fi, cellular, etc.) or may intermittently try to establish the link upon after a period of time has passed.

According to some embodiments, user device 102 may provide gift mobile application 402 with access to a contacts list stored by user device 102, so that a user of gift mobile application 402 may select a stored contact as a gift recipient. As will be appreciated by those of skill in the art, a contacts list may comprise a plurality of records, where each record corresponds to an individual or entity and includes associated stored contact information such as a name, telephone number(s), address(es), and other such information. As shown in FIG. 4A, a user interface of gift mobile application 402 may allow a gifter to select a recent contact 404 as the gift recipient by selecting a displayed image or name associated with the recent contact 404. In some embodiments, a recent contact 404 may represent an individual that the gifter has given a gift to in the recent past via gift mobile application 402. In some embodiments, a recent contact 404 may represent an individual that a user has communicated with via user device 102 (e.g., via phone call, text message, email, etc.) in the recent past. According to some embodiments, a user interface of gift mobile application 402 may allow a gifter to specify a gift recipient by searching for a name of an individual using a text search field 406, which may cause gift mobile application 402 to perform a search of the contacts list stored on user device 102. According to some embodiments, a user interface of gift mobile application 402 may display some or all of a list of contacts 407 from which to select a gift recipient. In some embodiments, the displayed list of contacts 407 may be configured to scroll to reveal a different portion of the list in response to receiving a user input, such as a vertical swipe on a touchscreen of user device 102.

In some embodiments, gift mobile application 402 may be configured to allow a gifter to select a plurality of gift recipients and the gifter may specify whether an identical gift is to be sent to all of the gift recipients individually, or whether a single gift is to be sent to all of the gift recipients for their collective use. For example, a gifter may send three friends a gift of $100 to collectively spend at a particular restaurant, meaning that the gift will be exhausted when $100 is spent at the restaurant by any one of the gift recipients, or when the total amount of the gift is spent by adding up the expenditures of all three gift recipients at the restaurant. Furthermore, in some embodiments, a gifter may send a location-based group gift in which the gifter specifies a redemption location and conditions the gift on the occurrence that all gift recipients must be at the location to utilize the gift. For example, if a gifter wants two friends to meet for lunch, the gifter may create a gift to a particular restaurant but specify that both friends must be physically present at the restaurant in order for the gift to be used. In this case, gift application server 120 may receive location data (e.g., GPS data) from mobile devices of the gift recipients and verify that both recipients' user devices 102 are present at the specified restaurant location prior to allowing the gift to be used. In some embodiments, the system may allow a gifter to specify an unknown gift recipient based on a specified merchant or location. For example, if a gifter is buying a cup of coffee and they want to buy a coffee for the person in line behind them (or another stranger), they may select a "pay it forward" feature of the gift mobile application 402 that may allow the gifter to provide a gift to the next person who makes a purchase from the location at which the gifter has just made a purchase.

As shown in FIG. 4B, in some embodiments, a user interface of gift mobile application 402 may allow a gifter to select and/or configure a gift to send to a gift recipient by inputting or selecting a gift amount, which may also be referred to as a maximum gift amount, and one or more redemption locations. The gift amount may represent the maximum amount of value that may be withdrawn from an account associated with the gifter in relation to the gift. The one or more redemption merchants may represent merchants, ecommerce websites, stores, or locations at which the gift is authorized to be used. For example, the gift recipient may select a movie theater chain as the redemption merchant, which means that the gift recipient would only be authorized to redeem the gift at the specified movie chain. According to some embodiments, gift mobile application 402 may provide a number of predetermined gift amounts 408 that may be selected by the gifter. In some embodiments, the gifter may type in a customized gift amount via a gift amount input field. Gift mobile application 402 may provide a number of predetermined or recent redemption merchants 412 that may be selected by the gifter selecting an icon or button associated with the associated redemption merchant 412. According to some embodiments, gifter may search for redemption merchants by inputting the name of a desired redemption merchant into redemption merchant search field 412. According to some embodiments, gift application server 120 may store a list of redemption merchants that are compatible for use with system 100 and gift mobile application 402 may communicate with gift application server 120 in response to a search entered into redemption merchant search field 414 to receive search results. According to some embodiments, gift mobile application 402 may provide a list of redemption merchants 415 that may be displayed and manipulated in a manner similar to the list of contacts 407 shown in FIG. 4A. In some embodiments, gift mobile application 402 may allow a gifter to designate a type of redemption merchant instead of a particular redemption merchant. For example, instead of selecting a particular movie theater chain, the gifter may instead select "movie theaters," and system 100 may enable the gift to be used at a plurality of different movie theaters and chains of movie theaters based on a classification of the merchant determined by system 100 when the gift is redeemed.

Including and in addition to aspects shown in FIGS. 4A-B, in some embodiments, gift mobile application 402 may be configured to enable a gifter to specify or customize various other aspects of a gift, including, but not limited to, the gift recipient, the merchant identity, merchant type, redemption location, the amount of the gift, media associated with the gift (e.g., messages, images, videos, look and feel of the gift, artwork and the like sent in association with the gift), an account associated with the gifter from which to fund the gift, an account associated with the gift recipient for receiving payments or reimbursements relating to the gift, an expiration date and/or time of the gift after which the gift will no longer be valid for use, an authorized use date and/or time of the gift before which the gift may not be authorized for use, an electronic locking mechanism associated with the gift that is described in greater detail below. Further, in some embodiments, gift mobile application 402 may be configured to send and/or receive messages from gift application server 120 or another user device 102. For example, in some embodiments, user device 102 associated with the gifter may receive notifications from gift application server 120 and/or user device 102 associated with the gift recipient, such as a notification that the gift recipient has redeemed the gift. Likewise, in some embodiments, user device 102 associated with the gift recipient may receive notification from gift application server 120 and/or user device 102 associated with the gifter, such as, for example, messages sent from the gifter or clues to assist in unlocking an electronic locking mechanism associated with a gift.

Figure 5B:
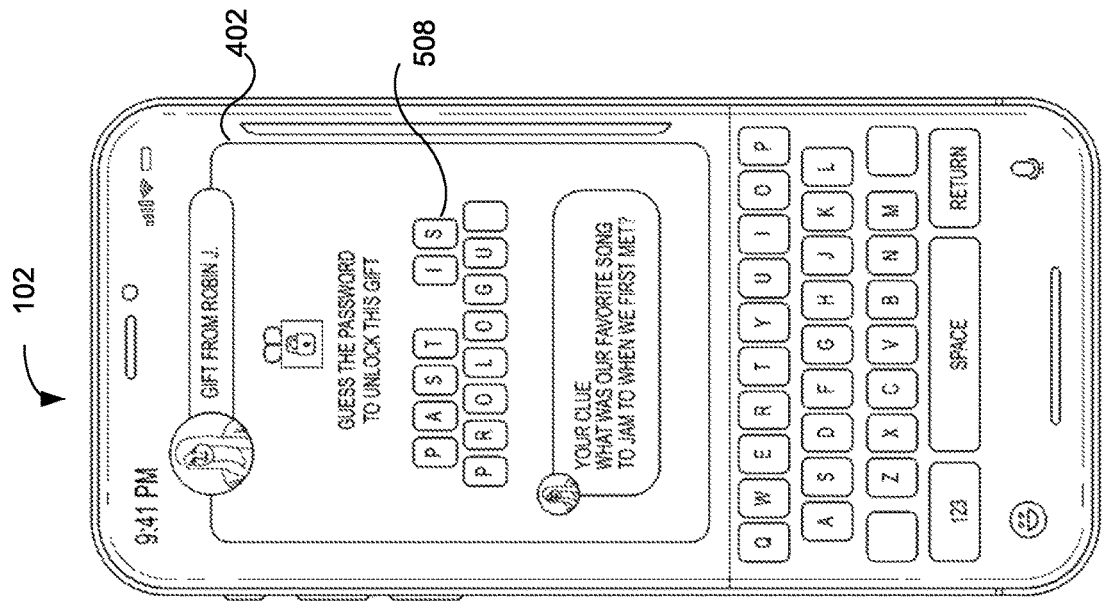
FIG. 5A, FIG. 5B, FIG. 5C, and FIG. 5D are exemplary embodiments of user interfaces of a customizable electronic locking mechanism of a software application for providing gifts.
Figure 5A:
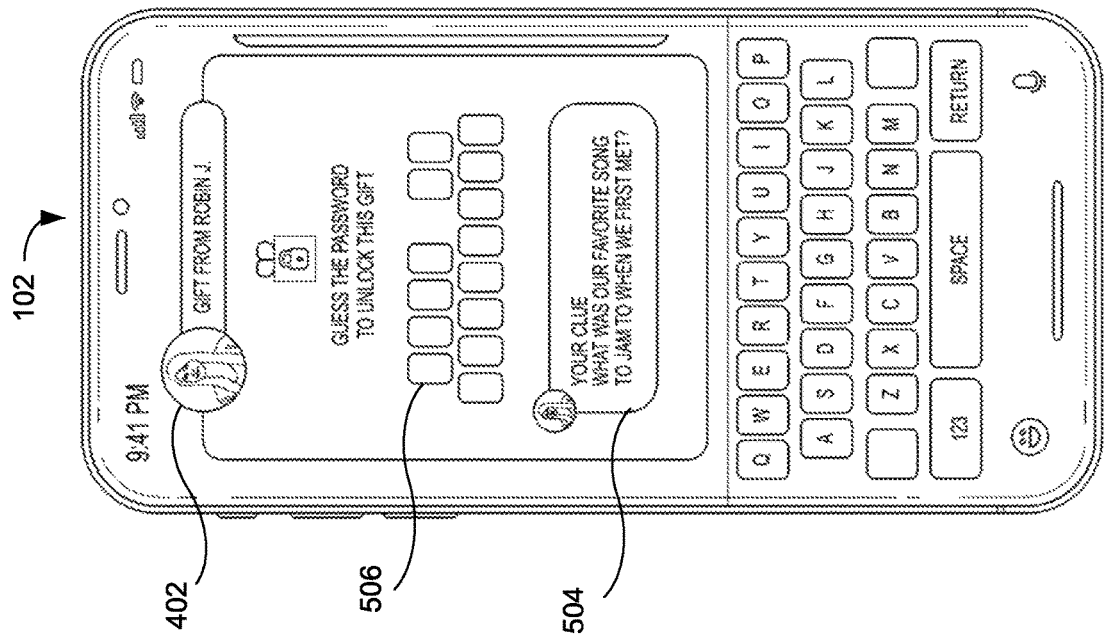
Figure 5D:
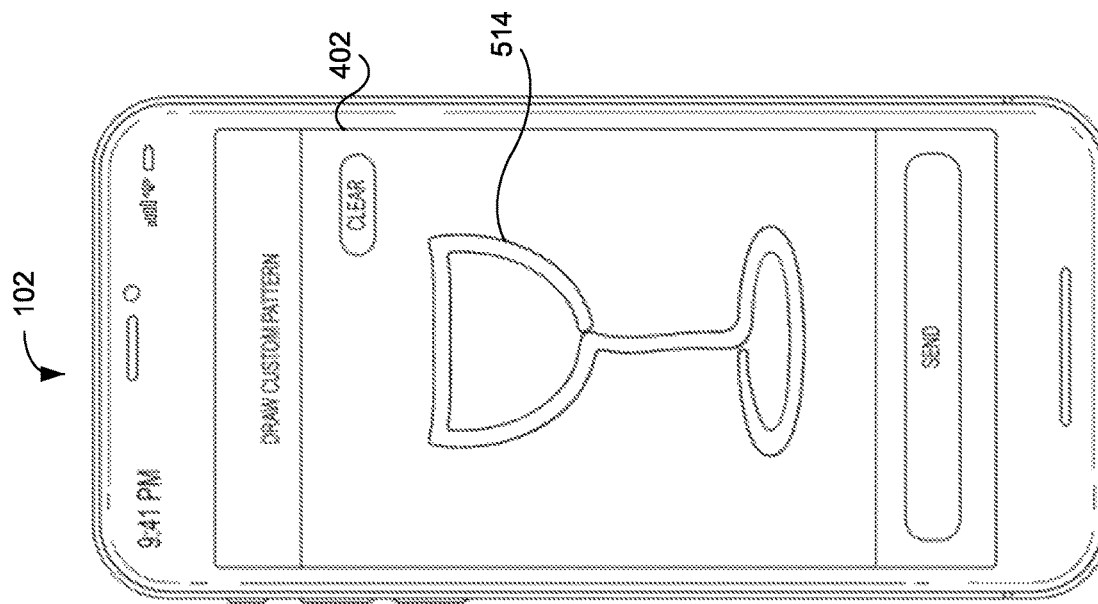
Figure 5C:
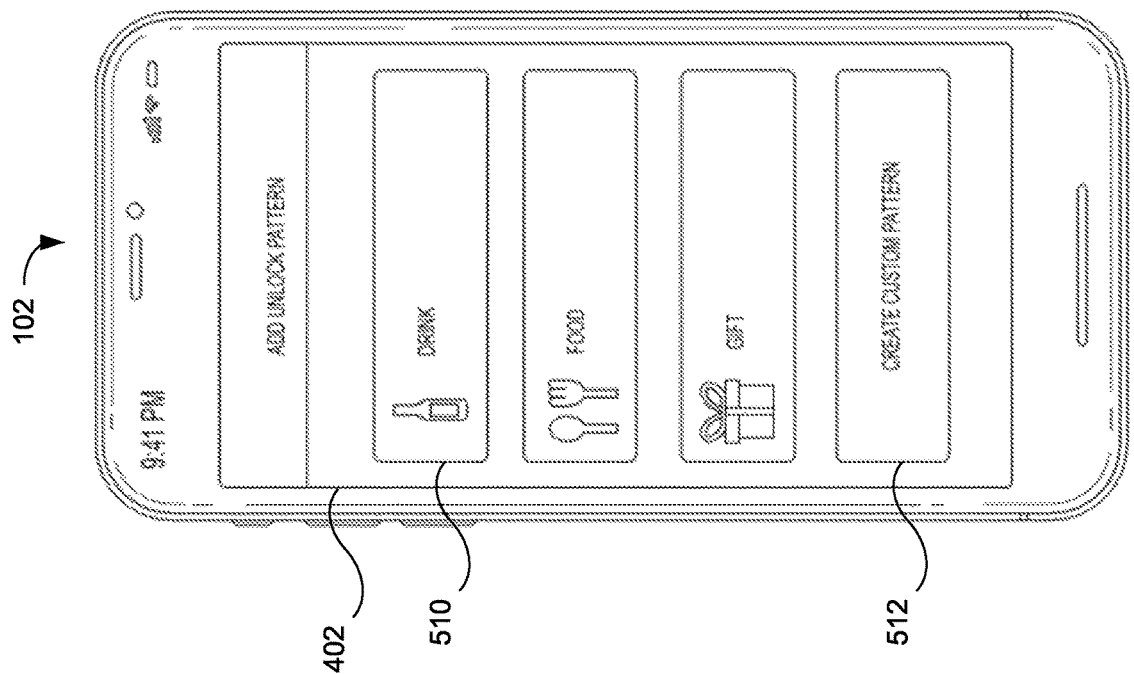

FIGS. 5A-D show example embodiments of electronic lock user interfaces of a gift mobile application 402 being run on user device 102. In particular, FIG. 5A shows an example embodiment of a user interface of gift mobile application 402 that is configured to present a gift recipient with an electronic lock and FIG. 5B shows an example embodiment of a user interface of gift mobile application 402 that shows user inputs to the electronic lock user interface that represent an attempt to unlock a gift being restricted for use by the electronic lock of gift mobile application 402. FIG. 5C shows an example embodiment of a user interface of a gift mobile application 402 that allows a user to select an unlock pattern to apply as a locking mechanism and FIG. 5D shows an example embodiment of a user interface of a gift mobile application that allows a user to input a custom pattern as a locking mechanism.

As shown in FIG. 5A, an electronic lock may include an electronic lock prompt 504 and an electronic lock interface 506. According to some embodiments, electronic lock prompt 504 may represent a clue or instruction providing guidance to a gift recipient on how to solve the electronic lock. According to some embodiments, the electronic lock prompt 504 may be specified by the gifter at the time of creation of the gift by selecting a predetermined lock prompt 504 or by providing a customized lock prompt 504. In some embodiments, a lock prompt 504 may be associated with a lock solution that represents the input that must be entered into electronic lock interface 506 to unlock a gift, message, or other file that is being protected by the electronic lock. According to some embodiments, electronic lock interface 506 may comprise one or more fields that may receive user inputs, such as for example, a number of input boxes and spaces as shown in FIG. 5A. In some embodiments, the number of input boxes and spaces may be arranged and presented by electronic lock interface 506 to correspond to the number of characters and spacing associated with the lock solution. As shown in FIG. 5B, a gift recipient may input a lock input 508 to attempt to unlock the electronic lock. In the example shown in FIG. 5B, lock input 508 represents a song title corresponding to electronic lock prompt 504. According to some embodiments, gift mobile application 402 may locally store the lock solution associated with an electronic lock on user device 102. In such cases, gift mobile application 402 may unlock an associated file, such as an electronic gift, a media file, an image, a message, or any other such type of file, upon detecting that the gift solution has been correctly entered into electronic lock interface 506. According to some embodiments, upon detecting that an incorrect gift solution has been entered into electronic lock interface 506, gift mobile application 402 may cause user device 102 associated with the gift recipient to send an incorrect solution message to user device 102 associated with the gifter. The incorrect solution message may provide a notification that the gift recipient has entered an incorrect solution to the electronic lock and may provide the incorrect solution for the gifter's viewing and entertainment. According to some embodiments, the gift mobile application 402 may provide a messaging functionality that may allow the gifter to send additional clues to the gift recipient for viewing on user device 102. In some embodiments, gift mobile application 402 may provide a remote unlock functionality that allows the gifter to remotely unlock a gift sent to the gift recipient, so that the gifter may authorize the gift recipient to access and use the gift despite failed attempts at unlocking the gift. In some embodiments, gift mobile application 402 may be configured to enable a gifter to specify a maximum number of unlock attempts, such that in response to gift mobile application 402 determining that the gift recipient has incorrectly attempted to unlock the electronic lock beyond the maximum number of unlock attempts, then gift mobile application 402 may cancel the gift sent to the gift recipient and provide notifications to one or more of the gifter and the gift recipient that the gift has been cancelled due to the gift recipients failure to unlock the gift within the number of attempts specified by the gifter. According to some embodiments, an electronic lock may comprise an image that a user must trace or color in by swiping on a touchscreen associated with user device 102. For example, in some embodiments, the electronic lock may be configured to unlock if the gift recipient traces around a target image within an accuracy that falls within a predetermined confidence range.

In some embodiments, an electronic lock may include a trace locking mechanism that includes an image or pattern specified by the gifter that the gift recipient may sufficiently trace or draw in order to unlock the electronic lock. As shown in FIG. 5C, gift mobile application 402 may include a user interface that may allow a gifter to input a selection of one or more items to serve as a trace locking mechanism, which may serve as an electronic lock to an electronic item. For example, gift mobile application 402 may cause gifter user device 102 to display one or more selectable buttons 510 that may each be associated with a predetermined image, icon, drawing or pattern that may correspond to a trace locking mechanism solution. In some embodiments, a gifter may for example, via input to user device 102, select a stored item image to serve as a trace locking mechanism by selecting a selectable button 510. Alternatively, according to some embodiments, a gifter may create a customized trace pattern to serve as an electronic locking mechanism by selecting a customization button 512 and then inputting (e.g., via user input to a touchscreen device) a custom trace locking mechanism 514 as shown in FIG. 5D.

According to some embodiments, in response to receiving a user input indicative of a selection of a predetermined trace locking mechanism (e.g., a selection of a selectable button 510) or creation of a custom trace locking mechanism 514, system 100 (e.g., gift application server 120) may associate the selected/custom trace locking mechanism with an electronic gift or other electronic item (e.g., a media file, image, message, or other electronic file) selected by the gifter and to be sent to a gift recipient, such that the gift or other item may not be accessed and/or utilized by the gift recipient until the gift recipient has unlocked the trace locking mechanism by inputting a corresponding trace locking mechanism solution. In other words, in some embodiments, a gift recipient may receive an electronic gift or other electronic item via gift mobile application 402, but gift mobile application 402 may prevent the recipient from accessing or utilizing the electronic gift/item until the recipient properly unlocks the trace locking mechanism by inputting a corresponding trace locking mechanism solution. In some embodiments, gift application server 120 may store the gift or electronic item until determining that the electronic lock has been unlocked, at which point gift application server 120 may forward the gift or electronic item to gift recipient user device 102.

According to some embodiments, a trace locking mechanism may be successfully unlocked by a gift recipient in response to the gift recipient entering a user input (e.g., a trace pattern input into a touch display of a user device 102) into gift recipient user device 102 that satisfactorily corresponds to a trace locking mechanism solution that is associated with the trace locking mechanism. In some embodiments, a trace locking mechanism solution may be a trace pattern that corresponds to an image associated with the trace locking mechanism. For example, if the trace locking mechanism is an image of a bottle, then to unlock the associated electronic gift or other electronic item, a gift recipient may be required to trace an image of the bottle, by for example, swiping their finger or a stylus across a touchscreen of user device 102 in a trace pattern that satisfactorily mirrors the shape of the bottle. According to some embodiments, a trace pattern input by the gift recipient may be considered to satisfactorily mirror the shape of the trace locking mechanism solution if a predetermined amount of the trace pattern input by the gift recipient falls within an inner boundary 516 and an outer boundary 518 of the trace locking mechanism solution. In some embodiments, a trace pattern input by the gift recipient may be considered to satisfactorily mirror the shape of the trace locking mechanism solution if the trace pattern input by the gift recipient is exceeds a predetermined threshold of similarity to the trace locking mechanism solution. According to some embodiments, gift application server 120 may determine a degree of similarity between the trace pattern input by the gift recipient and the trace locking mechanism by using image recognition techniques, statistical techniques and/or machine learning techniques. According to some embodiments, the trace pattern input by the gift recipient may be transmit to gifter user device 102 so that gifter may indicate whether the gift recipient has input a correct solution or not. In such embodiments, gift application server 120 may unlock the electronic lock in response to receiving an indication from gifter user device 102 that a satisfactory solution has been entered by gift recipient.

While web server 110, location services server 112, transaction server 114, gift application server 120, merchant database terminal 126, merchant POS terminal 127, third party financial server 128 and user device 102 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, location services server 112, transaction server 114, gift application server 120, a merchant database terminal 126, merchant POS terminal 127, third party financial server or user device 102 may include a greater or lesser number of components than those illustrated. Furthermore, although much of the present disclosure is described with respect to the creation and sending of a locked gift, it should be understood that it is contemplated that system 100 may allow the electronic locking and transmission of other electronic items, such as for example, electronic files, media files, images, videos, messages, and the like.

Figure 6:
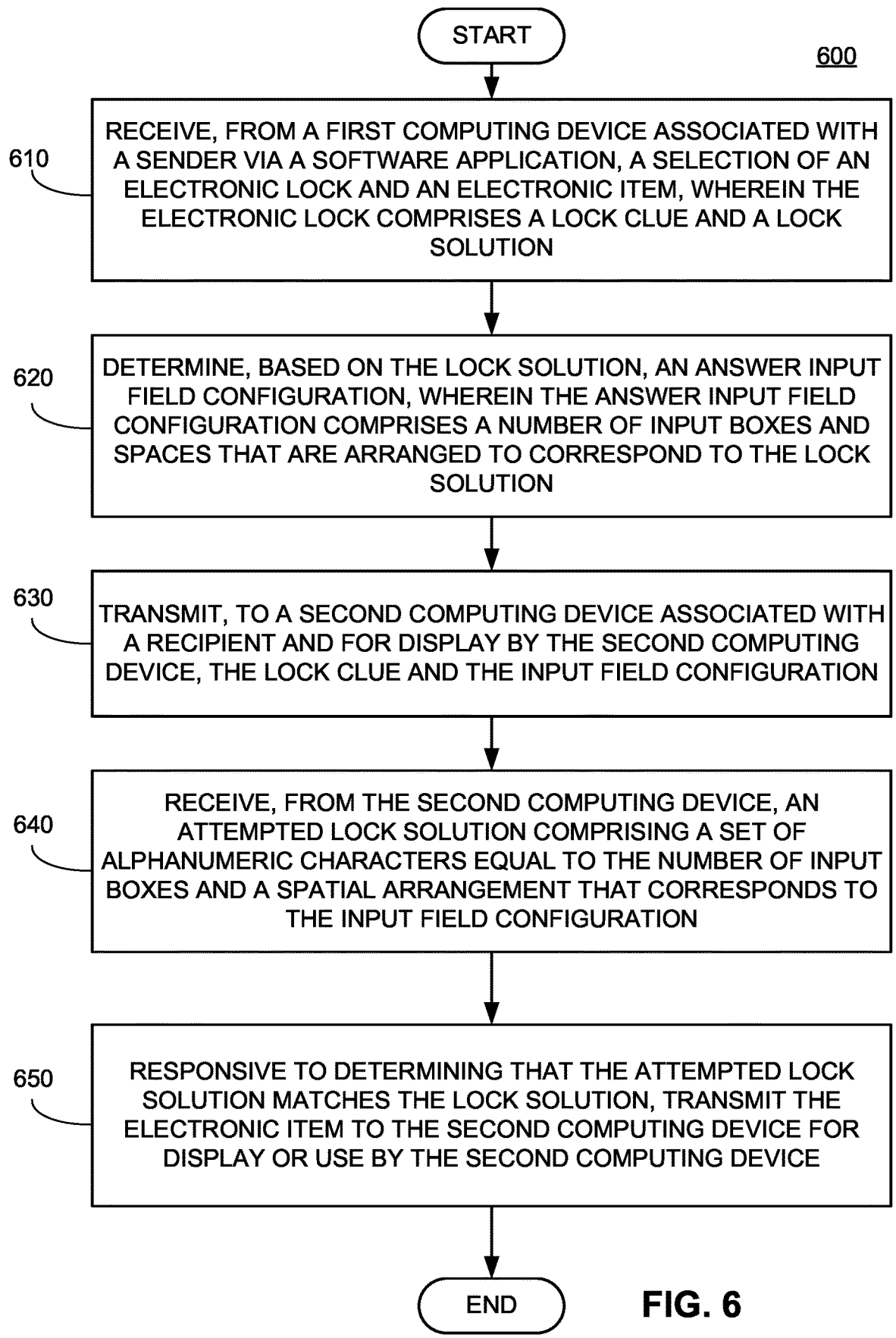
FIG. 6 is a flowchart of an exemplary method for providing a locked electronic item.

FIG. 6 shows a flowchart of a method 600 for providing a locked electronic item, such as an electronically conveyed financial gift. Method 600 may be performed by a system including some or all of web server 110, location services server 112, transaction server 114, database 118, gift application server 120, merchant database terminal 126, merchant POS terminal 127, third party financial server 128 and one or more user devices 102.

In block 610, the system (e.g., via gift application server 120) may receive, from a first computing device associated with a sender via a software application, a selection of an electronic lock and the electronic item. In some embodiments, the electronic lock may include a lock clue and a lock solution. According to some embodiments, the electronic item may be an image. In some embodiments, the electronic item may be a tokenized primary account number (PAN) or electronic gift card. In some embodiments the electronic item may be a data file or media file. According to some embodiments, the system (e.g., via gift application server 120) may associate the electronic lock with the electronic item such that the contents of the electronic item may not be viewed, accessed or used until the electronic lock is unlocked. For example, in some embodiments gift application server 120 may regulate access to a gift by storing the gift at the gift application server 120 (or another remote storage location) until the electronic lock associated with the electronic item is unlocked (either by the gift recipient entering a correct solution or by the gifter instructing the system to unlock it), at which point the gift application server 120 may forward the gift to the gift recipient user device 102. In some embodiments, the gift may be sent to the gift recipient user device 102 prior to the associated electronic lock being unlocked, but the gift recipient may be prevented from accessing or using the gift until gift application server 120 allows such access via gift mobile application 402.

In block 620, the system (e.g., via gift application server 120) may determine, based on the lock solution, an answer input field configuration. In some embodiments, the answer input field configuration may include a number of input boxes and spaces that are arranged to correspond to the lock solution. For example, if the lock solution is the phrase "Lock solution", then the answer input field configuration may be a first series of four input boxes corresponding to each letter of "Lock" and a second series of eight input boxes corresponding to each letter of "solution", and one space representing the space between "Lock" and "solution".

In block 630, the system (e.g., gift application server 120) may transmit, to a second computing device associated with a recipient and for display by the second computing device, the lock clue and the input field configuration.

In block 640, the system (e.g., gift application server 120) may receive, from the second computing device, an attempted lock solution comprising a set of characters, such as alphanumeric characters, equal to the number of input boxes. For example, the lock solution may be comprised of letters, numbers, and/or symbols that may conventionally be created as user inputs using via a computer or smartphone keyboard. In some embodiments, the set of alphanumeric characters may be configured in spatial arrangement that corresponds to the input field configuration. For example, if the input field configuration corresponds to a first series of four input boxes and a second series of eight input boxes separated by a space as described in the example above, then the characters of the attempted lock solution may also be in the form of a 4-character "word" separated from an eight-character "word" by one space.

In block 650, the system (e.g., gift application server 120) may transmit the electronic item to the second computing device for display or use by the second computing device. According to some embodiments, the system may transmit the electronic item in response to determining that the attempted lock solution matches the lock solution. According to some embodiments, in response to determining that the attempted lock solution does not match the lock solution, the system may transmit a failure notification to the second computing device for display by the second computing device. In some embodiments, the failure notification may include an indication that the attempted lock solution is incorrect.

According to some embodiments, the system may transmit, to the first computing device and for display by the first computing device, an unlock attempt notification, wherein the unlock attempt notification comprises an indication of the attempted lock solution and an indication of a success or failure to unlock the electronic media item. In some embodiments, the unlock attempt notification may include an indication of a number of failed unlock attempts. Accordingly, in some embodiments, system 100 may allow the sender of the locked electronic item to monitor the recipient's attempts to unlock the item. In some embodiments, the system may receive an instruction to unlock the electronic item from the first computing device and transmit, to the second computing device and based on the instruction to unlock the electronic item, an unlock notification and the electronic item for display or use by the second computing device. For example, if the sender of the locked electronic item decides that the recipient is not going to solve the lock, the recipient may decide to nonetheless provide the recipient with access to the item by remotely unlocking the item.

In some embodiments, the system may receive data representative of one or more unlock conditions from the first computing device and prior to transmitting the electronic item to the second computing device, the system may verify that the one or more unlock conditions are satisfied. For example, in some embodiments, the system (e.g., gift application server 120) may store the locked electronic item until the system has received an indication that the lock has been properly solved, at which point the system (e.g., via web server 112) may transmit the now electronic item to the recipient's device. Thus, in some embodiments, "locking"

an item may mean that the item is not provided to the recipient device until it is unlocked. However, in some embodiments, the system may transmit the electronic item to the recipient device (e.g., user device 102) along with the electronic lock, such that the recipient device prevents access to the locked item until the item is properly unlocked. In some embodiments, a mobile application installed on the recipient device may serve to restrict access to the electronic item while it is locked.

In some embodiments, the one or more unlock conditions may include an access date that may represent a date before which the locked item may not be unlocked. Thus, in some embodiment, verifying that the one or more unlock conditions are satisfied may include determining that the current date is equal to or beyond the access date. In some embodiments, the one or more unlock conditions may include a maximum number of unlock attempts and verifying that the one or more unlock conditions are satisfied may include determining that a number of attempted lock solutions received from the second device in relation to the electronic lock does not exceed the maximum number of unlock attempts. In some embodiments, the one or more unlock conditions may include a gift unlock location and verifying that the one or more unlock conditions are satisfied may include determining, based on location data received from the second computing device, that the second computing device is within a predetermined proximity of the gift unlock location. According to some embodiments, the one or more unlock conditions may include a gift unlock location and method 600 may further include receiving, from the second computing device in association with the attempted lock solution, an image obtained from an image capture device associated with the second computing device and identifying a landmark in the image using image recognition techniques. In some embodiments, verifying that the one or more unlock conditions are satisfied may include determining that the identified landmark is within a predetermined proximity of the gift unlock location.

In some embodiments, the system may receive, from the second computing device in association with the attempted lock solution, an indication of a positive identification of a user of the second computing device based on one or more of: a positive identification of the user's fingerprint that is obtained via a fingerprint scanner associated with the second computing device, a positive identification of the user's face using image recognition techniques and based on an image obtained by an image capture device associated with the second computing device, a positive identification of a user's voice using voice recognition techniques and based on an audio recording obtained by a microphone associated with the second computing device, or a positive identification of a user's identity based on matching motion data obtained from a gyroscope associated with the second computing device to a stored gesture associated with authenticating the user's identity.

Figure 7:
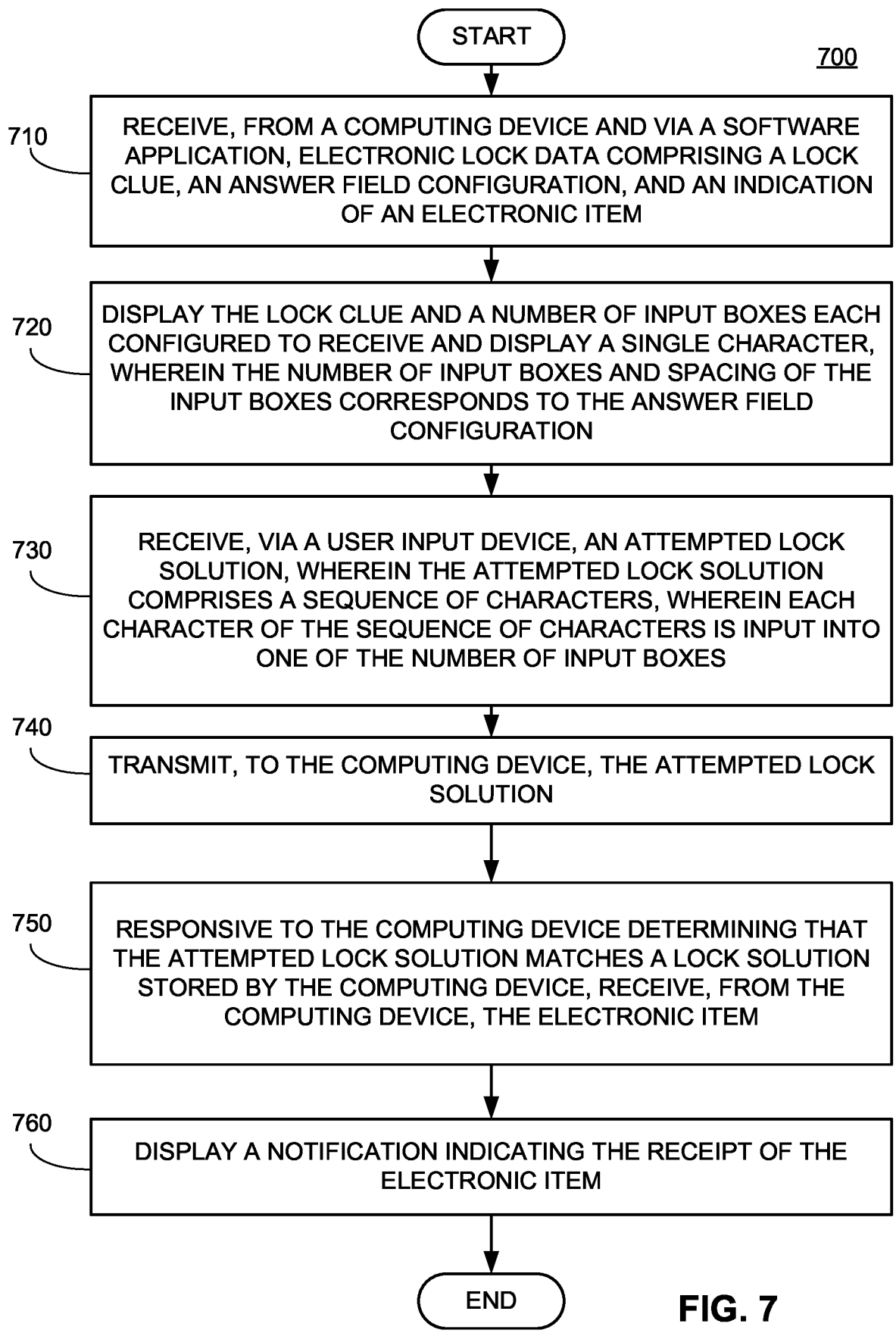
FIG. 7 is a flowchart of another exemplary method for providing a locked electronic item.

FIG. 7 shows a flowchart of a method 700 for providing a locked electronic item, such as an electronically conveyed financial gift. Method 700 may be performed by a system including some or all of web server 110, location services server 112, transaction server 114, database 118, gift application server 120, a merchant database terminal 126, merchant POS terminal 127, third party financial server 128 and one or more user devices 102.

In block 710, the system (e.g., via user device 102) may receive, from a computing device and via a software application, electronic lock data comprising a lock clue, an answer field configuration, and an indication of the electronic item. In some embodiments, the software application may be installed on a recipient user device.

In block 720, the system (e.g., via user device 102) may display the lock clue and a number of input boxes each configured to receive and display a single character. In some embodiments, the number of input boxes and spacing of the input boxes may correspond to the answer field configuration.

In block 730, the system (e.g., user device 102) may receive, via a user input device, an attempted lock solution. In some embodiments, the attempted lock solution may include a sequence of characters, wherein each character of the sequence of characters is input into one of the number of input boxes. For example, the recipient may use a keyboard associated with the recipient user device 102 to input a letter into each input box that may be displayed by the recipient user device 102 in association with the lock clue.

In block 740, the system (e.g., user device 102) may transmit the attempted lock solution to the computing device.

In block 750, the system (e.g., user device 102) may receive the electronic item from the computing device. For example, if the system determines that the received attempted lock solution matches to a stored lock solution corresponding to the lock clue, then the system may unlock the locked item and provide access to it.

In block 760, the system (e.g., user device 102) may display a notification indicating receipt of the electronic item. For example, a recipient user device 102 may receive the unlocked item and display a notification that the unlocked item has been received and is now available to be accessed or used.

In some embodiments of method 700, the system may receive data representative of a location-based unlock condition from the computing device. For example, a sender of the locked item may specify a condition that the item may only be unlocked when the recipient is at the specified location. The system may display information representative of an unlock location based on the data representative of the location-based unlock condition. The system may receive location data from a location sensor and transmit the location data to the computing device. In some embodiments, the system may receive, from the computing device, the electronic item in response to the computing device determining based on the location data that the location-based unlock condition is met.

According to some embodiments of method 700, the system may receive data representative of a time-based unlock condition from the computing device, display information representative of an unlock time based on the data representative of the time-based unlock condition, and receive the electronic item from the computing device in response to the computing device determining based on the time data that the time-based unlock condition is met. In other words, in some embodiments, a sender of the locked item may use system 100 to input a condition that the locked item may only be unlocked during a specified time frame, and system 100 may verify that the time condition is met before allowing the item to be unlocked.

According to some embodiments of method 700, the system may receive a request for user authentication from the computing device and may authenticate a user prior to transmitting the attempted lock solution to the computing device. In some embodiments, authenticating a user may include one or more of: obtaining the user's fingerprint from a fingerprint scanner and matching the obtained fingerprint to a stored fingerprint of the user within a predetermined confidence level, obtaining an image of the user's face from an image capture device and matching the image to a stored image of the user's face using image recognition techniques, obtaining a recording of the user's voice from a microphone and applying voice analysis techniques to positively identify the user by comparing the recording to stored voice data associated with the user, or obtaining motion data from a gyroscope and matching the motion data to a stored gesture within a predetermined confidence level, wherein the stored gesture represents an identifying gesture associated with the user.

Figure 8:
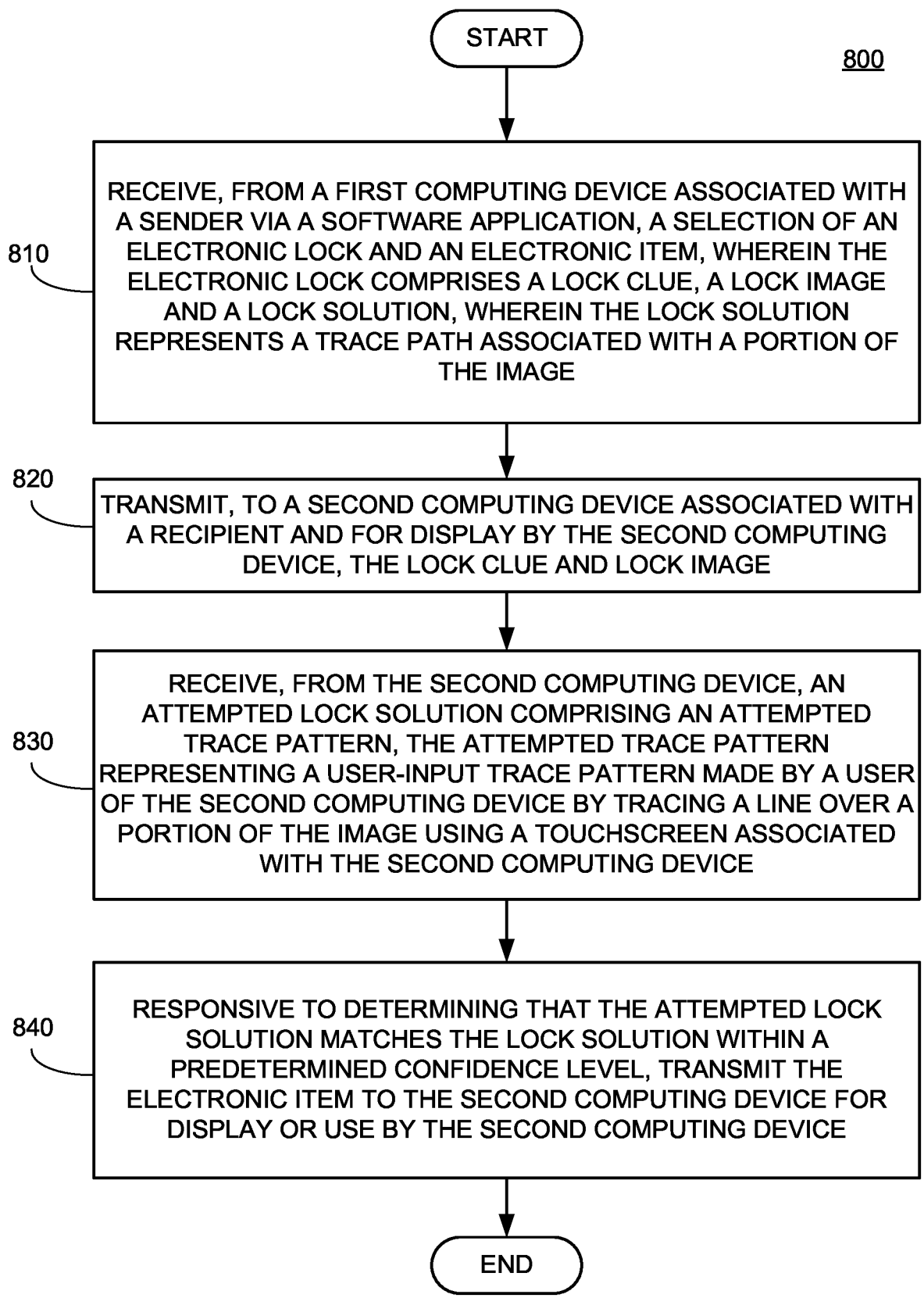
FIG. 8 is a flowchart of another exemplary method providing a locked electronic item.

FIG. 8 shows a flowchart of a method 800 for providing a locked electronic item, such as an electronically conveyed financial gift. Method 800 may be performed by a system including some or all of web server 110, location services server 112, transaction server 114, database 118, gift application server 120, a merchant database terminal 126, merchant POS terminal 127, third party financial server 128 and one or more user devices 102.

In block 810, the system (e.g., via gift application server 120) may receive, from a first computing device associated with a sender via a software application, a selection of an electronic lock and the electronic item. In some embodiments, the electronic lock may include a lock clue, a lock image and a lock solution. According to some embodiments, the lock solution may represent a trace path associated with a portion of the image. In some embodiments, the lock solution may be received from the first computing device. For example, according to some embodiments, the lock solution may be a user-input trace pattern made by a user of the first computing device by tracing a line over a portion of the image using a touchscreen associated with the first computing device.

In block 820, the system (e.g., via gift application server 120) may transmit the lock clue and lock image to a second computing device associated with a recipient and for display by the second computing device.

In block 830, the system (e.g., via gift application server 120) may receive an attempted lock solution from the second computing device. According to some embodiments, the attempted lock solution may include an attempted trace pattern. In some embodiments, the attempted trace pattern may represent a user-input trace pattern made by a user of the second computing device by tracing a line over a portion of the image using a touchscreen associated with the second computing device.

In block 840, the system (e.g., via gift application server 120) may transmit the electronic item to the second computing device for display or use by the second computing device. In some embodiments, the system may transmit the electronic item in response to determining that the attempted lock solution matches the lock solution within a predetermined confidence level. According to some embodiments, determining that the attempted lock solution matches the lock solution within a predetermined confidence level may include: overlaying the attempted trace pattern over the trace path, wherein the attempted trace pattern comprises a plurality of points, determining a plurality of verification distances by, for each of the plurality of points of the attempted trace pattern, determining a nearest distance between the point and the trace path, determining an average verification distance by calculating an average of the plurality of verification distances, and determining that the average verification distance is less than a predetermined threshold.

According to some embodiments of method 800, the system may receive, from the second computing device in association with the attempted lock solution, an indication of a positive identification of a user of the second computing device based on one or more of: a positive identification of the user's fingerprint via a fingerprint scanner associated with the second computing device, a positive identification of the user's face using image recognition techniques and based on an image obtained by an image capture device associated with the second computing device, a positive identification of a user's voice using voice recognition techniques and based on an audio recording obtained by a microphone associated with the second computing device, or a positive identification of a user's identity based on matching motion data obtained from a gyroscope associated with the second computing device to a stored gesture associated with authenticating the user's identity.

Figure 9:
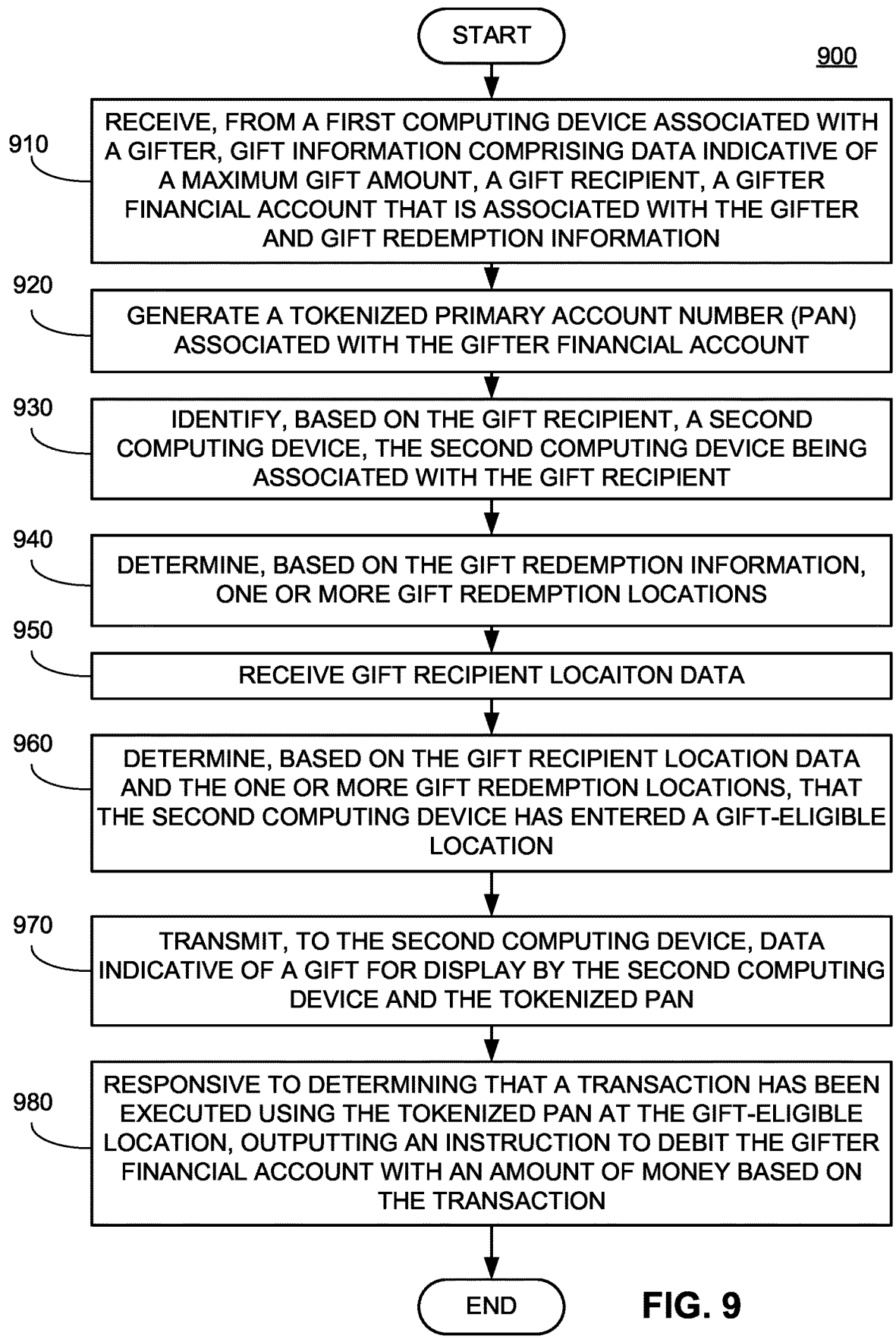
FIG. 9 is a flowchart of an exemplary method for providing a customized location-activated gift.

FIG. 9 shows a flowchart of a method 900 for providing a customized location-activated gift, such as an electronically conveyed financial gift. Method 900 may be performed by a system including some or all of web server 110, location services server 112, transaction server 114, database 118, gift application server 120, merchant database terminal 126, merchant POS terminal 127, third party financial server 128 and one or more user devices 102.

In block 910, the system (e.g., via gift application server 120) may receive, from a first computing device associated with a gifter, gift information comprising data indicative of a maximum gift amount, a gift recipient, and a gifter financial account that is associated with the gifter and gift redemption information. According to some embodiments, the gift redemption information may include an identification of one or more merchants or types of merchants at which the gift may only be redeemed.

In block 920, the system (e.g., via gift application server 120) may generate a tokenized primary account number (PAN) associated with the gifter financial account.

In block 930, the system (e.g., gift application server 120) may identify, based on the gift recipient, a second computing device, the second computing device being associated with the gift recipient. For example, in some embodiments, a gift recipient may have preregistered the second computing device (e.g., user device 102) with a software application, such as gift mobile application 402, by virtue of installing the software application on the second computing device and/or creating and filling out a user account associated with the software application. Thus, in some embodiments, gift application server 120 may be configured to identify user device 102 associated with the gift recipient based on an identification number associated with the device, such as a phone number, a MAC address, an IP address, or the like.

In block 940, the system (e.g., gift application server 120) may determine, based on the gift redemption information, one or more gift redemption locations. According to some embodiments, determining one or more gift redemption locations may include looking up one or more merchant locations associated with the one or more merchants. In some embodiments, each gift redemption location of the one or more gift redemption locations may correspond to a geofenced area.

In block 950, the system (e.g., location services server 112) may receive gift recipient location data. According to some embodiments, gift recipient location data may include global positioning satellite (GPS) data received from the second computing device. In some embodiments, gift recipient location data may include wireless access point connection information associated with the second computing device. According to some embodiments, the wireless access point connection information may include locations of one or more wireless access points. In some embodiments, gift recipient location data may include visual information obtained from an image capture device associated with the second computing device.

In block 960, the system (e.g., location services server 112) may determine, based on the gift recipient location data and the one or more gift redemption locations, that the second computing device has entered a gift-eligible location. According to some embodiments, determining that the second computing device has entered a gift-eligible location may comprise determining that the location of the second computing device is within a geofenced area associated with a gift redemption location. In some embodiments, determining that the second computing device has entered a gift-eligible location may include determining the approximate position of the second computing device based on the locations of the one or more wireless access points and determining that the approximate position of the second computing device corresponds to the gift-eligible location. In some embodiments, determining that the second computing device has entered a gift-eligible location may include identifying a visual marker by performing image recognition techniques on the visual information and determining that the visual marker is associated with the gift-eligible location.

In block 970, the system (e.g., gift application server 120) may transmit, to the second computing device, data indicative of a gift for display by the second computing device and the tokenized PAN. In some embodiments, transmitting the tokenized PAN may include transmitting data configured to be stored in a digital wallet of the second computing device. In some embodiments, transmitting the tokenized PAN may include transmitting an image for display by the second computing device.

In block 980, the system (e.g. gift application server 120) may, output an instruction to debit the gifter financial account with an amount of money based on the transaction. According to some embodiments, the system may output the instruction in response to determining that a transaction has been executed using the tokenized PAN at the gift-eligible location.

Figure 10:
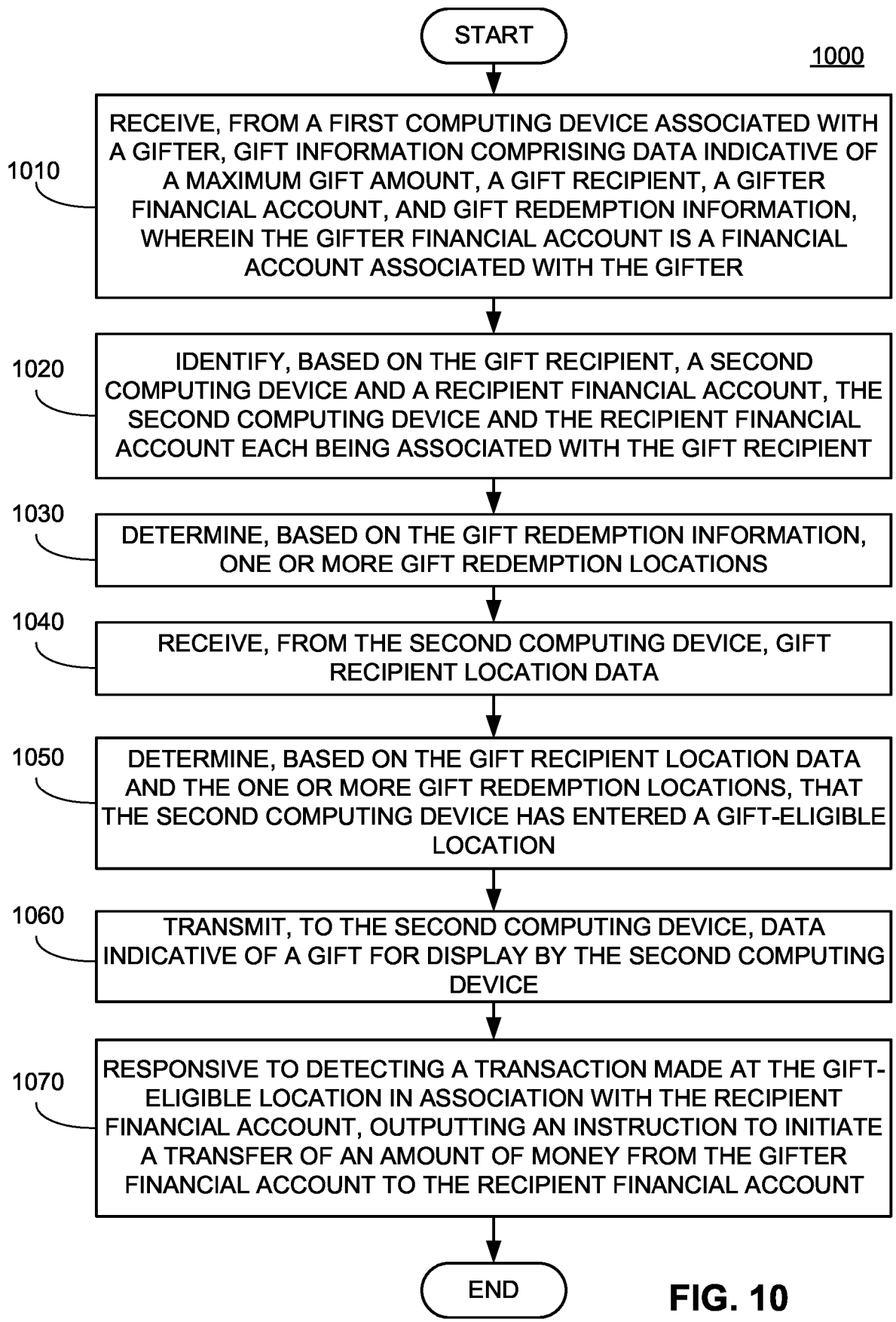
FIG. 10 is a flowchart of another exemplary method for providing a customized location-activated gift.

FIG. 10 shows a flowchart of a method 1000 for providing a customized location-activated gift, such as an electronically conveyed financial gift. Method 1000 may be performed by a system including some or all of web server 110, location services server 112, transaction server 114, database 118, gift application server 120, a merchant database terminal 126, merchant POS terminal 127, third party financial server 128 and one or more user devices 102.

In block 1010, the system (e.g., via, gift application server 120) may receive, from a first computing device associated with a gifter, gift information comprising data indicative of a maximum gift amount, a gift recipient, a gifter financial account, and gift redemption information, wherein the gifter financial account is a financial account associated with the gifter. In some embodiments, the gift redemption information may include an identification of one or more merchants.

In block 1020, the system (e.g., via gift application server 120) may identify, based on the gift recipient, a second computing device and a recipient financial account, the second computing device and the recipient financial account each being associated with the gift recipient. According to some embodiments, a recipient financial account may be a credit card account, a checking account, a savings account, or the like.

In block 1030, the system (e.g., gift application server 120) may determine, based on the gift redemption information, one or more gift redemption locations. According to some embodiments, determining the one or more gift redemption locations may include looking up one or more merchant locations associated with the one or more merchants. In some embodiments, each gift redemption location of the one or more gift redemption locations may correspond to a geofenced area.

In block 1040, the system (e.g., location services server 112) may receive, from the second computing device, gift recipient location data.

In block 1050, the system (e.g. location services server 112) may determine, based on the gift recipient location data and the one or more gift redemption locations, that the second computing device has entered a gift-eligible location. According to some embodiments, determining that the second computing device has entered a gift-eligible location may include determining that the location of the second computing device is within a geofenced area associated with a gift redemption location.

In block 1060, the system (e.g. gift application server 120) may transmit, to the second computing device, data indicative of a gift for display by the second computing device.

In block 1070, the system (e.g. transaction server 114) may output an instruction to initiate a transfer of an amount of money from the gifter financial account to the recipient financial account. According to some embodiments, the system may output the instruction in response to detecting a transaction made at the gift-eligible location in association with the recipient financial account. In some embodiments, detecting a transaction made at the gift-eligible location in association with the recipient financial account may include monitoring transaction data comprising a plurality of transaction authorization requests originating from one or more merchant POS devices, wherein each transaction authorization request comprises: an attempted purchase financial account representing a financial account used to make an attempted purchase, an attempted transaction amount, and a merchant code; and identifying a gift-eligible transaction authorization request of the plurality of transaction authorization requests by determining that the recipient financial account matches the attempted purchase financial account of a first transaction authorization request and determining, based on the merchant code associated with the first transaction authorization request, that a location of a merchant POS device associated with the first transaction authorization request corresponds to the gift-eligible location.

Figure 11:
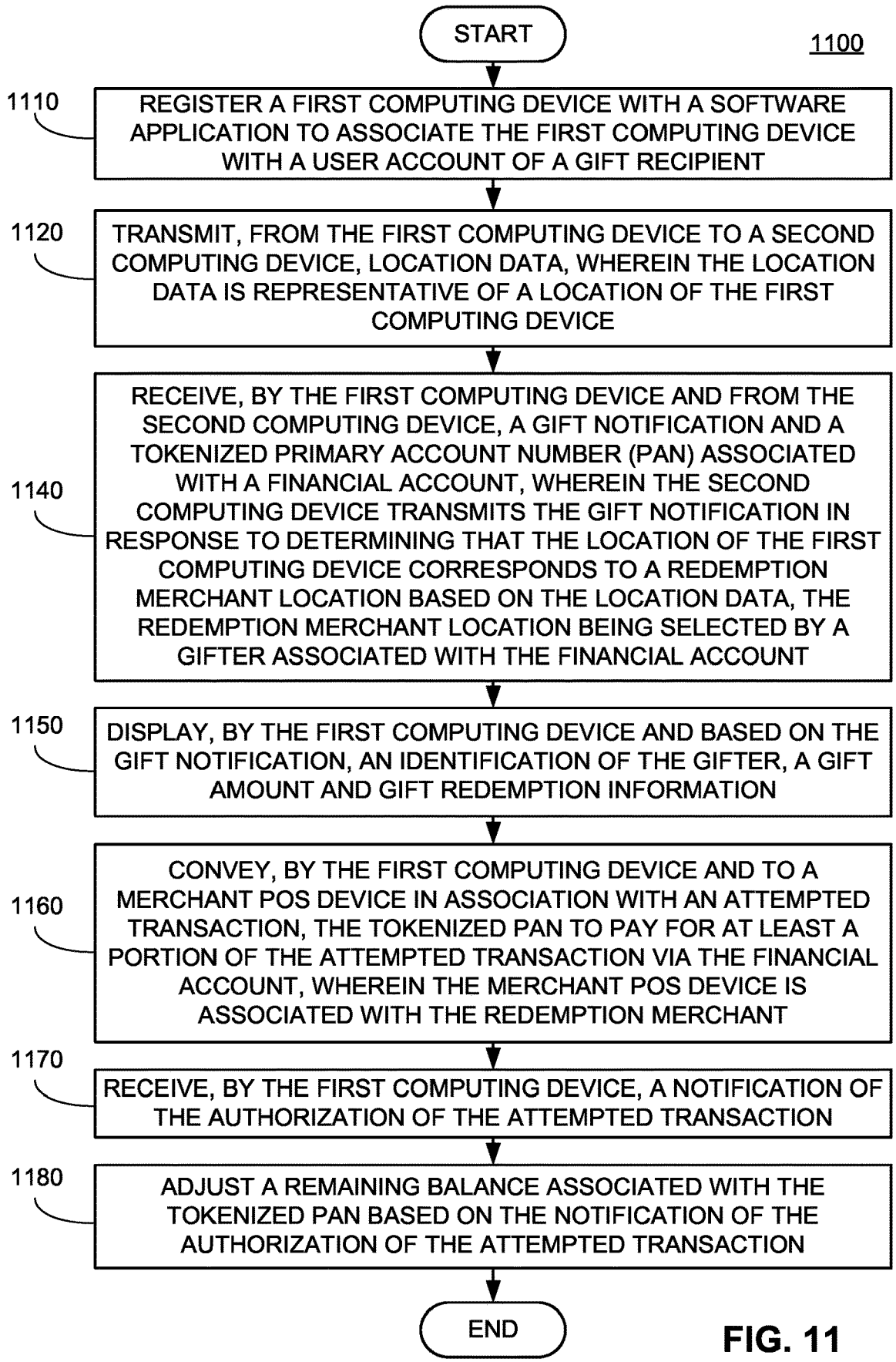
FIG. 11 is a flowchart of another exemplary method for providing a customized location-activated gift.

FIG. 11 shows a flowchart of a method 1100 for providing a customized location-activated gift, such as an electronically conveyed financial gift. Method 1100 may be performed by a system including some or all of web server 110, location services server 112, transaction server 114, database 118, gift application server 120, a merchant database terminal 126, merchant POS terminal 127, third party financial server 128 and one or more user devices 102.

In block 1110, the system (e.g., via user device 102) may register a first computing device with a software application to associate the first computing device with a user account of a gift recipient.

In block 1120, the system (e.g., via user device 102) may transmit, from the first computing device to a second computing device, location data, wherein the location data is representative of a location of the first computing device.

In block 1130, the system (e.g., via user device 102) may receive, by the first computing device and from the second computing device, a gift notification and a tokenized primary account number (PAN) associated with a financial account, wherein the second computing device transmits the gift notification in response to determining that the location of the first computing device corresponds to a redemption merchant location based on the location data. In some embodiments, the redemption merchant location may be selected by a gifter associated with the financial account. In some embodiments, the tokenized PAN may be stored in a digital wallet.

In block 1140, the system (e.g., via user device 102) may display, by the first computing device and based on the gift notification, an identification of the gifter, a gift amount and gift redemption information.

In block 1150, the system (e.g., via user device 102) may convey, by the first computing device and to a merchant POS device in association with an attempted transaction, the tokenized PAN to pay for at least a portion of the attempted transaction via the financial account. According to some embodiments, the merchant POS device may be associated with the redemption merchant. In some embodiments, the tokenized PAN may be conveyed to the merchant POS device using near field communication.

In block 1160, the system (e.g. via user device 102) may receive, by the first computing device, a notification of the authorization of the attempted transaction.

In block 1170, the system (e.g. via user device 102) may adjust a remaining balance associated with the tokenized PAN based on the notification of the authorization of the attempted transaction. For example, in some embodiments, user device 102 of gift recipient may maintain and display a current balance of the gift so that the gift recipient may know how much of the gift remains to be redeemed.

According to some embodiments, the system may receive, by the first computing device and from the second computing device, the redemption merchant location. In some embodiments, the system may store geofencing information corresponding to an area associated with the redemption merchant location. According to some embodiments, transmitting location data associated with the first computing device may occur in response to determining, by the first computing device, that first computing device has entered the area associated with the redemption merchant location. In some embodiments, the system may receive virtual lock data representative of puzzle, riddle, or password selected by the gifter. The system may display, by the second computing a virtual lock, wherein the virtual lock is configured to prevent use of the tokenized PAN until a predetermined user input is received. In some embodiments, the system may receiving, by the second computing device, the predetermined user input, wherein the predetermined user input unlocks the virtual lock to enable use of the tokenized PAN.

Figure 12:
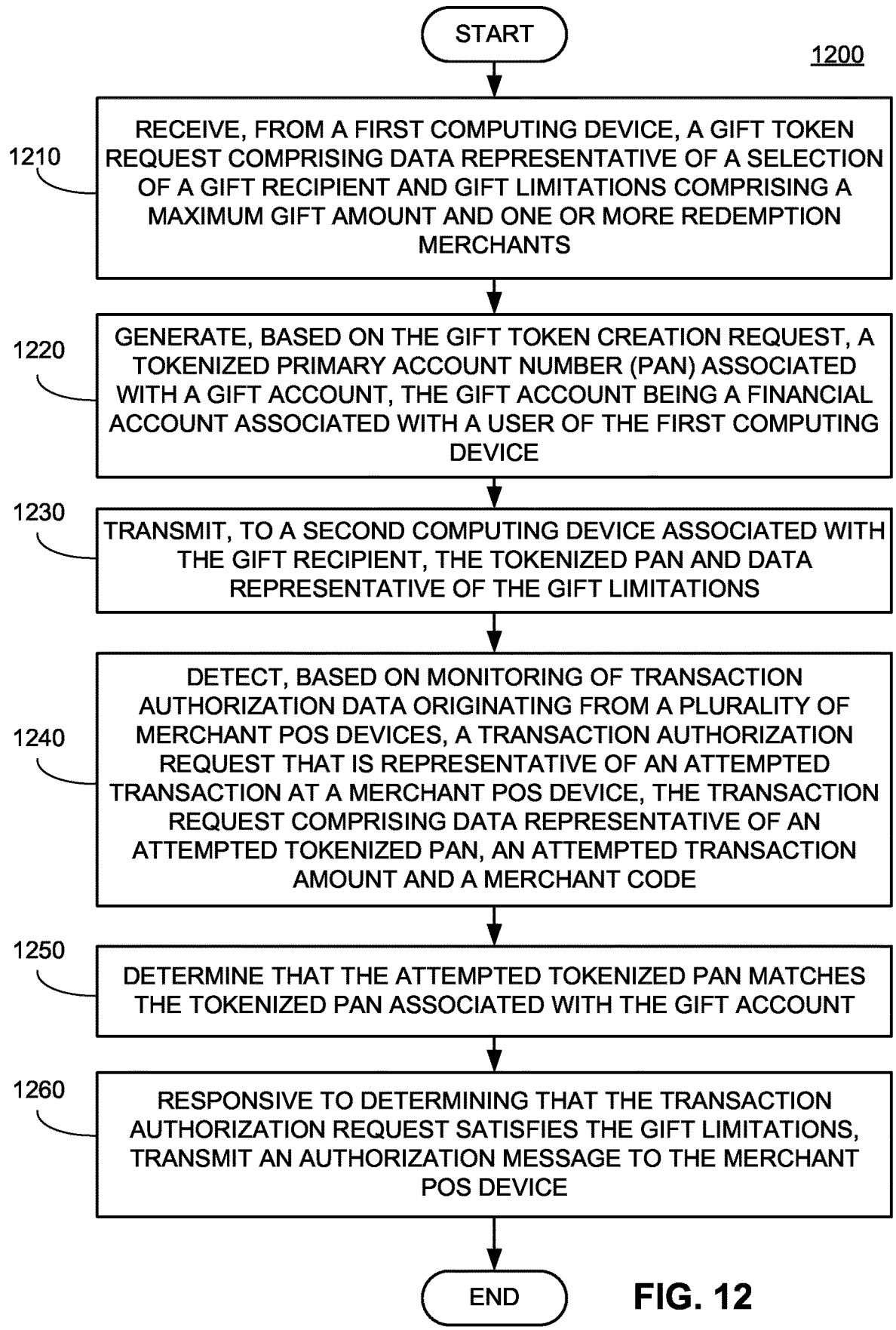
FIG. 12 is a flowchart of an exemplary method for providing a gift.

FIG. 12 shows a flowchart of a method 1200 for providing a gift, such as an electronically conveyed financial gift. Method 1200 may be performed by a system including some or all of web server 110, location services server 112, transaction server 114, database 118, gift application server 120, merchant database terminal 126, merchant POS terminal 127, third party financial server 128 and one or more user devices 102.

In block 1210, the system (e.g., via gift application server 120) may receive a gift token creation request from a first computing device (e.g., via a first user device 120). According to some embodiments, the gift token creation request may include data representative of a selection of a gift recipient, gift limitations and/or a selection of a gift account from a plurality of financial accounts associated with the gifter. For example, in some embodiments, gift mobile application 402 installed on user device 102 of the gifter may be configured to select a friend from a contact list stored on user device 102 to designate as the gift recipient. Further, gift mobile application 402 may allow the gifter to customize the gift by inputting gift limitations associated with the gift. In some embodiments, the gift limitations may include, for example, a maximum gift amount, one or more redemption merchants, and/or a gift expiration date. According to some embodiments, the maximum gift amount may be the maximum amount of money that may be transferred out of a financial account associated with the gifter and sent to either a merchant or the gift recipient in response to redemption of the gift. According to some embodiments, gift application server 120 may maintain a gift account balance that tracks the amount of the gift remaining in the event that the gift recipient only redeems a portion of the gift. For example, if a gift is $50 and the gift recipient spends $30 on one transaction, gift application server 120 may adjust the remaining balance of the gift to be $20, which it may then designate as the new maximum gift amount. According to some embodiments, if a gift recipient attempt to make a purchase for more than the maximum amount of the gift, system 100 (e.g., gift application server 120 or transaction sever 114) may either reject the attempted transaction or may only allocate the maximum gift amount to the purchase. For example, if a gift is $50 and the gift recipient attempts to make a purchase of $60 using the gift, system 100 may either reject the transaction or may authorize $50 to be spent towards the purchase, requiring the gift recipient to provide the additional $10 by some other means of payment. According to some embodiments, gift limitations comprising one or more redemption merchants may represent one or more merchants at which the gift is authorized to be spent. For example, the gifter may specify a particular restaurant or chain of restaurants at which the gift is authorized to be redeemed. In some embodiments, the gift limitations may comprise a type of redemption merchant that represents a category of merchants at which the gift may be redeemed, such as restaurants, movie theaters, grocery stores, hotels, airlines, and the like. According to some embodiments, gift limitations may include a gift expiration date that represents a date upon which the gift expires and may no longer be redeemed. In some embodiments, the gift token creation request may include data representative of a selection of a gift account from a plurality of financial accounts associated with the gifter. For example, in some embodiments, gift mobile application 402 may allow a gifter to specify a financial account from which the gift shall be funded, by for example, selecting an account from one or more financial accounts associated with the gifter that are stored by gift mobile application 402. According to some embodiments, gift mobile application 402 may store credentials associated with the one or more financial accounts associated with the gifter that may be accessed by system 100 to initiate a transfer of funds from a selected gift account.

In block 1220, the system (e.g., via gift application server 120) may generate a tokenized primary account number (PAN) associated with the gift account. In some embodiments, a tokenized PAN may be a 16-digit number associated with the gift account. For example, in some embodiments the tokenized PAN may be a 16-digit number that corresponds to the gift account that is associated with a credit card number of the gifter. Accordingly, in some embodiments, the tokenized PAN may be a 16-digit number that does not match any previously issued credit card number, but that is associated with a credit card account of the gifter such that when the tokenized PAN is used to make a gift-eligible purchase, the money for the purchase is debited to the associated credit card account of the gifter. According to some embodiments, the tokenized PAN may be generated based on the gift token creation request. In some embodiments, the gift account may be a financial account that is associated with a user of the first computing device.

In block 1230, the system (e.g. via web server 110) may transmit the tokenized PAN and data representative of the gift limitations to a second computing device that may be associated with the gift recipient. According to some embodiments, the tokenized PAN may be in a format that allows it to be stored in a digital wallet of the user device 102 associated with the gift recipient. For example, in some embodiments, a tokenized PAN may be an image file such as a .jpeg or other such image file type. In some embodiments, the tokenized PAN may be of a type configured to be received by an API associated with the digital wallet. According to some embodiments, transmitting the tokenized PAN may include transmitting an image. For example, in some embodiments, transmitting the tokenized PAN may include transmitting an image of a credit card that displays a number matching the tokenized PAN. In some embodiments, the image may include a scannable feature, such as a bar code or QR code, that may be used to convey the tokenized PAN to merchant terminal 127 in response to be scanned or captured by an image capture device associated with merchant terminal 127.

In block 1240, the system (e.g. transaction server 114) may detect a transaction authorization request that is representative of an attempted transaction at a merchant POS device. According to some embodiments, the system may detect the transaction authorization request based on monitoring of transaction authorization data originating from a plurality of merchant POS devices (e.g., merchant POS devices 172, 174, 176). For example, in some embodiments, transaction server 114 may receive a real-time stream of transaction authorization requests originating at a merchant, from for example, self-checkout kiosks, card readers associated with cash registers, websites where a user has entered a credit card or gift card number, and the like. In some embodiments, if the entity associated with organization 108 is different than an entity associated with a financial account utilized by a purchaser, transaction server 114 may receive a plurality of transaction authorization requests in a batch at one time. In some embodiments, a transaction authorization request may comprise data representative of one or more of an attempted tokenized PAN, an attempted transaction amount, a merchant code and an attempted transaction date and/or time. For example, if a gift recipient attempts to buy an item at a merchant using a tokenized PAN, the tokenized PAN used by the gift recipient may be represented in the transaction authorization request as the attempted tokenized PAN. Likewise, the amount of the attempted purchase may be represented as the attempted transaction amount. In some embodiments, a merchant code may represent a code from which transaction server 114 may identify the identity of the merchant at which the attempted purchase is being made and/or the type of merchant (i.e., restaurant, movie theater, etc.). According to some embodiments, the geographic location and/or address of the merchant at which the attempted purchase is made may be determined by location services server 112 by looking up an address of the merchant in response to identifying the merchant based on the merchant code.

In block 1250, the system (e.g. transaction server 114) may determine that the attempted tokenized PAN matches the tokenized PAN associated with the gift account. According to some embodiments, transaction server 114 may maintain a list of one or more financial account numbers of tokenized PANs that correspond to gifts created by gifters. Transaction server 114 may monitoring the incoming transaction authorization requests to flag and/or identify attempted transactions that correspond with a gift. In this manner, transaction server 114 can identify transactions that are associated with gifts ("gift transactions") that were provided via system 100. In some embodiments, transaction server 114 may identify gift transactions in real time, based on the monitoring of transaction authorization requests received in real time. In some embodiments, transaction server 114 may identify gift transactions intermittently based on monitoring of transaction authorization requests received in batches. According to some embodiments, transaction server 114 receive a combination of real-time and batch transaction authorization requests and may thus identify some gift transactions in real time and some upon receiving and process a batch of transaction authorization requests.

In block 1260, the system (e.g. transaction server 114) may transmit an authorization message to the merchant POS device in response to determining that the transaction authorization request satisfies the gift limitations. According to some embodiments, determining that a transaction authorization request satisfies the gift limitations may include identifying an attempted transaction merchant associated with the attempted transaction based on the merchant code, determining that the attempted transaction merchant matches one of the one or more redemption merchants and/or determining that the attempted transaction date chronologically precedes the gift expiration date. For example, if a particular gift had associated gift limitations that specified that the gift could only be used at a movie theater for a maximum gift amount of $50, transaction server 114 may identity an attempted transaction having an attempted tokenized PAN that matches a stored tokenized PAN that is associated with a gift to determine that the attempted transaction is being made using the tokenized PAN that is associated with the gift and then transaction server 114 may compare the gift limitations associated with the stored tokenized PAN to the characteristics of the transaction to determine that the attempted transaction amount is less than the $50 limit and that, based on the merchant code, the attempted transaction is occurring at merchant POS terminal 127 associated with a movie theater. Thus, in this example, upon determining that the gift limitations have been satisfied, transaction server 114 may transmit an authorization message to merchant POS terminal 127 that indicates that the transaction has been authorized. The authorization message may represent an authorization of the attempted purchase that may cause merchant POS terminal 127 to authorize the transaction at the merchant location. In some embodiments, if transaction server 114 determines that the gift limitations are not satisfied, transaction server 114 may send a rejection message to merchant POS terminal 127 representing a rejection of the attempted transaction.

In some embodiments, upon authorizing a transaction, transaction server 114 may output an instruction to debit the gift account associated with the tokenized PAN with an amount equal to the attempted transaction amount if the attempted transaction amount is less than the maximum gift amount (or the remaining balance of the gift, if a prior gift transaction has been made) or the maximum gift amount if the attempted transaction amount is greater than or equal to the maximum gift amount. In some embodiments, the method may include determining a remaining gift amount that is equal to the maximum gift amount minus the amount debited to the gift account. Accordingly, system 100 may maintain a gift balance that tracks how much of the original gift has been spent and how much is remaining. In some embodiments, the method may include transmitting a notification representing the remaining gift amount to user device 102 associated with the gift recipient, so that the gift recipient can be informed as the remaining balance of the gift. In some embodiments, a similar notification may be transmitted to user device 102 associated with the gifter so that the gifter may also be informed when a gift has been redeemed and what the remaining balance is. According to some embodiments, gift mobile application 402 may be configured to display a remaining balance associated with a gift so that the gifter and/or gift recipient may view the remaining balance of one or more gifts at any time.

In this way, system 100 allows a gifter to provide a gift to a gift recipient in a manner such that that the purchase of the gift is charged directly to a specified financial account of the gifter. Thus, if the gift is never used or is lost, the gifter's account will not be charged. In some embodiments, if the attempted purchase amount is more than the gifted amount, the gifter will only be charged with the maximum gift amount. Further, if less than the entire gift is used, the gifter's account will only be charged for the actual amount of the gift that was redeemed, thereby preventing the gifter from wasting money on some or all of a gift that is never redeemed.

Figure 13:
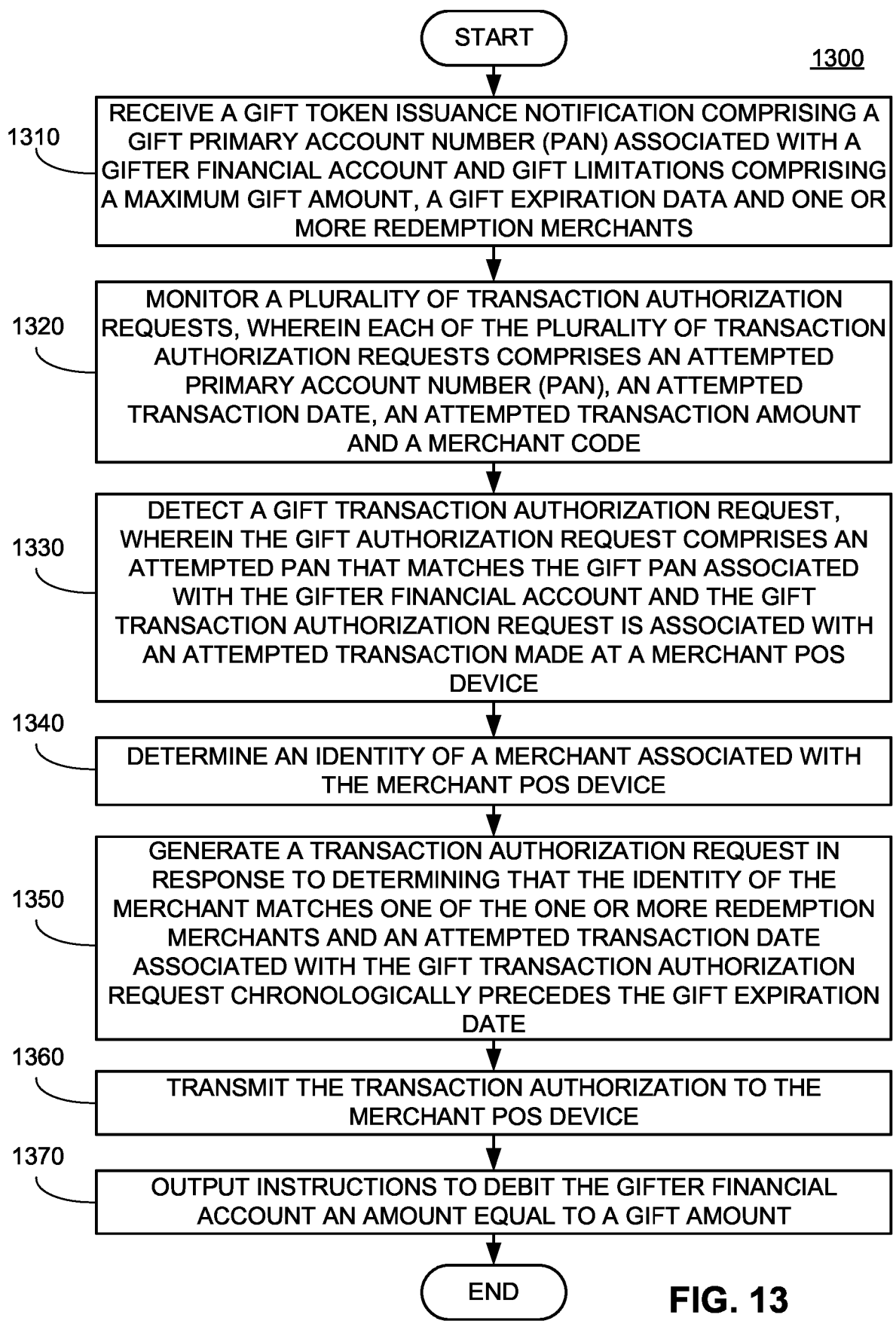
FIG. 13 is a flowchart of another exemplary method for providing a gift.

FIG. 13 shows a flowchart of a method 1300 for providing a gift, such as an electronically conveyed financial gift. Method 1300 may be performed by a system including some or all of web server 110, location services server 112, transaction server 114, database 118, gift application server 120, a merchant database terminal 126, merchant POS terminal 127, third party financial server 128 and one or more user devices 102.

In block 1310, the system (e.g., via transaction server 114) may receive a gift token issuance notification. According to some embodiments, the gift token issuance notification may comprise a gift primary account number (PAN) associated with a gifter financial account and gift limitations. In some embodiments, the gift limitations may comprise a maximum gift amount, a gift expiration date and one or more redemption merchants. In some embodiments, the gift token issuance notification may include some or all of the same types of data described above with respect to a gift token creation request in step 610. In some embodiments, the gifter financial account may be a financial account that was selected by the gifter at the time of creating the gift.

In block 1320, the system (e.g., via transaction listener 115) may monitor a plurality of transaction authorization requests. According to some embodiments, each of the plurality of transaction authorization requests may comprise an attempted primary account number (PAN), an attempted transaction date, an attempted transaction amount and a merchant code.

In block 1330, the system (e.g., transaction server 114) may detect a gift transaction authorization request. According to some embodiments, the detection of the gift transaction authorization request may be based on the monitoring of the plurality of transaction authorization requests. In some embodiments, the gift transaction authorization request detected by the system may comprise an attempted PAN that matches the gift PAN associated with the gifter financial account. In some embodiments, the gift transaction authorization request may be associated with an attempted transaction made at a merchant POS device (e.g., merchant POS device 172).

In block 1340, the system (e.g., transaction server 120) may determine an identity of a merchant associated with the merchant POS device. According to some embodiments, the system may determine the identity of the merchant associated with the merchant POS device based on the merchant code of the gift transaction authorization request. In some embodiments, determining the identity of the merchant associated with the merchant POS device may include comparing the merchant code with a table of merchant codes and merchant identities, wherein each merchant code in the table is associated with a merchant identity. For example, in some embodiments, the system (e.g., transaction server 114) may store a table of merchants that correspond with merchant codes or other information that may be derived from a merchant code, so that the system may look up the identity of the merchant based on the merchant code.

In block 1350, the system (e.g., transaction server 114) may generate a transaction authorization in response to determining that the identity of the merchant matches one of the one or more redemption merchants and an attempted transaction date associated with the gift transaction authorization request chronologically precedes the gift expiration date. According to some embodiments, in response to determining that the current date is chronologically past the gift expiration date, the system may delete the gift token issuance notification comprising the gift PAN. Accordingly, in some embodiments, if a gift has an associated expiration date and the expiration date passes, the system (e.g., transaction server 114) may delete the gift token issuance notification and associated data so that the system will no search for the associated gift token when monitoring transaction authorization request data.

In block 1360, the system (e.g., transaction server 114) may transmit the transaction authorization to the merchant POS device.

In block 1370, the system (e.g. transaction server 114) may output instructions to debit the gifter financial account an amount equal to a gift amount. According to some embodiments, the gift amount may be an attempted transaction amount associated with the gift transaction authorization request. For example, if the gift recipient makes an attempted purchase that cost $30 in association with the gift PAN, then the gift amount may be $30. According to some embodiments, the gift amount may be equal to the maximum gift amount or a remaining balance of the gift. For example, in the maximum gift amount or remaining balance of the gift is $50 and the gift recipient makes a purchase that costs $60 using the gift PAN, then the gift amount may be $50.

Figure 14:
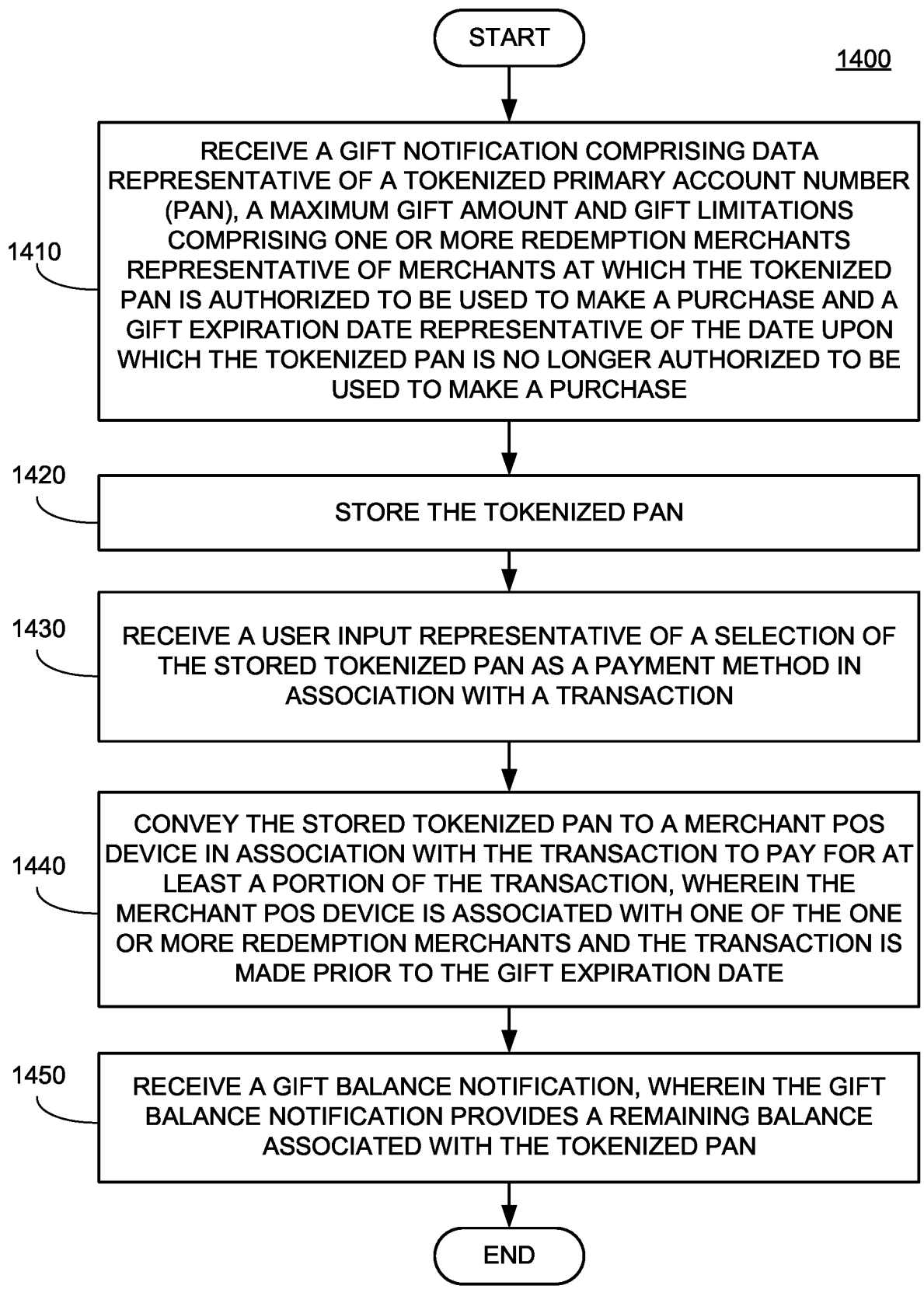
FIG. 14 is a flowchart of another exemplary method for providing a gift.

FIG. 14 shows a flowchart of a method 1400 for providing a gift, such as an electronically conveyed financial gift. Method 1400 may be performed by a system including some or all of web server 110, location services server 112, transaction server 114, database 118, gift application server 120, a merchant database terminal 126, merchant POS terminal 127, third party financial server 128 and one or more user devices 102.

In block 1410, the system (e.g., via user device 102) may receive a gift notification comprising data representative of a tokenized primary account number (PAN), a maximum gift amount and gift limitations. For example, a mobile device associated with a gift recipient may receive a gift notification that notifies the gift recipient of the issuance of the gift, the amount the gift is for, and any restrictions on the gift, such as locations at which the gift may be redeemed. According to some embodiments, the gift limitations may comprise one or more redemption merchants representative of merchants at which the tokenized PAN is authorized to be used to make a purchase and a gift expiration date representative of the date upon which the tokenized PAN is no longer authorized to be used to make a purchase. According to some embodiments, the gift notification may further comprise virtual lock data representative of a password required to access the tokenized PAN for use to make a purchase and user device 102 may provide access to the tokenized PAN for use to make a purchase in response to receiving a user input representative of the password.

In block 1420, the system (e.g., via user device 102) may store the tokenized PAN. In some embodiments, the tokenized PAN may be stored in a digital wallet of user device 102. In some embodiments, the tokenized PAN may be stored as an image on user device 102.

In block 1430, the system (e.g., user device 102) may receive a user input representative of a selection of the stored tokenized PAN as a payment method in association with a transaction. For example, in some embodiments, gift mobile application 402 may include a user interface that allows the gift recipient to select one or more stored tokenized PANs for use as a payment method in a transaction. In some embodiments, the digital wallet of user device 102 may allow the gift recipient to select a stored tokenized PAN for use as a payment method in a transaction. In some embodiments, a gift recipient may select a tokenized PAN for use as a payment method by loading an image of the tokenized PAN to be scanned or imaged by merchant POS terminal 127.

In block 1440, the system (e.g., user device 102) may convey the stored tokenized PAN to a merchant POS device in association with the transaction to pay for at least a portion of the transaction. For example, the gift recipient may be checking out at a store and may utilize the tokenized PAN to pay for a transaction by conveying the tokenized PAN to a merchant POS device associated with merchant POS terminal 127. In some embodiments, the tokenized PAN may be conveyed to merchant POS terminal 127 by using near-field communication (NFC) or by displaying an image that may be optically scanned or captured by an image capture device associated with merchant POS terminal 127. In some embodiments, the gift recipient may convey the tokenized PAN by typing the tokenized PAN into a keypad associated with merchant POS terminal 127. According to some embodiments, the merchant POS device may be associated with one of the one or more redemption merchants so that a gift limitation associated with the gift is satisfied and the gift is authorized for use. In some embodiments, the transaction may be made prior to a gift expiration date associated with the gift to satisfy another gift limitation that may be associated with the gift.

In block 1450, the system (e.g. user device 102) may receive a gift balance notification. In some embodiments, the gift balance notification may provide a remaining balance associated with the tokenized PAN. For example, if the original gift was for $50 and the gift recipient makes a $30 purchase using the tokenized PAN, user device 102 associated with the gift recipient may receive a notification with information representing that the balance associated with the tokenized PAN is now $20.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes an example of a typical user flow pattern. They are intended solely for explanatory purposes and not in limitation. A first person (the "gifter") may want to provide an electronic item, such as a customized electronic gift, to another (the "gift recipient"), and may desire to lock the electronic item via a customized lock selected or configured by the gifter. For example, the gifter may want to send a spouse a gift card to their favorite store as a gift to celebrate an anniversary but to add an element of playfulness or entertainment, the gifter may require the gift recipient to solve a puzzle or a riddle associated with the gift before the gift recipient is able to access the gift. Accordingly, the gifter may use a mobile application (e.g., gift mobile application 402) to create a customized gift to the selected store and may also lock the gift with a customized lock. For example, the gifter may create a lock that has a clue of "Our favorite date spot" and a solution of "downtown movie theater." The system (e.g., via gift application server 120) may send a notification to the gift recipient's smart phone (e.g., via user device 102) that displays the clue and along with a series of empty boxes that correspond to the spacing and number of letters in the solution. The gift recipient may enter letters into the boxes (e.g., via user device 102) in an attempt to solve the puzzle and may submit an attempted answer. The system (e.g., via gift application server 120) may determine whether the attempted answer is correct, and if incorrect may send a notification to both the gifter and the gift recipient that the attempted answer is incorrect. After being notified of several incorrect answers, the gifter may assist the gift recipient, by for example, inputting instructions to the system (e.g., via user device 102) to reveal the first word of the solution to the gift recipient. Upon the gift recipient entering the correct solution, the system may unlock the gift card so that the gift recipient may see that the locked item is a gift card to their favorite store and the gift card may be made available for use at the store. In some embodiments, the system may use transaction authorization request data to verify that the gift recipient has used the gift at the specified store before authorizing the transaction using the gift card. The system may allow the gifter to put other limitations on unlocking of the item or use of the gift, such as time and location restrictions. For example, the gifter may specify that the gift may only be unlocked if the gift recipient is at a pre-specified location or that the gift may only be unlocked or used the current date is beyond a date specified by the gifter. In some cases, the system (e.g., via gift application server 120) may enable the gifter to view, in real time, the user inputs and/or location of the gift recipient so that the gifter can monitor the gift recipient's attempts at unlocking the gift and provide real-time feedback, such as additional clues, to the gift recipient via the system. For example, in some embodiments, gift mobile application 402 may facilitate a real-time connection between gifter user device 102 and gift recipient user device 102 (e.g., via gift application server 120) to provide real-time interactivity between the two. In this way, the system may allow a user to apply a customized and interactive electronic lock to an electronic gift (or any type of transferable electronic file) to add entertainment and enjoyment to the act of providing the gift to another.

The following exemplary use case describes an examples of a typical user flow pattern. They are intended solely for explanatory purposes and not in limitation. A first person (the "gifter") may want to provide a gift to a friend (the "gift recipient") to spend at a particular merchant, such as a particular restaurant, but may want to surprise the recipient with the gift the next time the recipient goes to the restaurant. To create the gift, the gifter may open a mobile application (e.g., gift mobile application 402) on their smartphone (e.g., via user device 102) and may use the mobile application to select the friend as the gift recipient. The gifter may specify which financial account they want to use to fund the gift ("gift account") by selecting, for example, a particular credit card or checking account that is associated with their user account in the mobile application. The gifter may input an amount of the gift and a selection of the restaurant that is the subject of the gift and may enter other restrictions if desired, such as an expiration date or a date before which the gift may not be used or activated. After customizing the gift, the system (e.g., via gift application server 120) may determine a gift redemption location that is associated with the specified restaurant as designated by, for example, a geofence that defines an area around the restaurant. The system may then receive location data from a smartphone associated with the designated gift recipient to track the gift recipient's location. Upon determining (e.g., via location services server 112) that the gift recipient has entered the specified area around the restaurant, the system (e.g., via web server 110) may transmit a message to the gift recipient to notify them that they have received a gift from the gifter, and may also activate the gift for use. The gift may be sent to the gift recipient as a tokenized PAN for use in electronic payment at the restaurant or the gift may be in the form of a reimbursement to an account of the gift recipient following a purchase at the restaurant using an account that is associated with the gift recipient. In either case, the system (e.g., via transaction server 114) may receive and monitor transaction authorization request data generated by the restaurant (e.g., via merchant POS terminal 127) at the time of the purchase made by the gift recipient to identify the gift transaction and either authorize the expenditure using the tokenized PAN or initiate a reimbursement to the gift recipient's account. The system may utilize a merchant code in the transaction authorization request to positively identify that the purchase is being made at the designated restaurant before authorizing payment/reimbursement. The system may further verify that any other conditions placed on the gift by the gifter, such as date restrictions for example, may be satisfied by applying to the limitations to the data included in the transaction authorization request. In this way, the system may allow a gifter to provide a customized, location-activated gift to a friend that does not require the selected merchant(s) to be preregistered with the system so the gifter may have flexibility to provide a gift to nearly any establishment or group of establishments they desire. Further, the system allows the gifter to provide the gift as a surprise to the gift recipient in a situation where the gift recipient may immediately take advantage of the gift by being at the location where the gift may be redeemed at the exact time of receiving the gift and may allow the gifter to create the gift without paying anything until the gift is actually redeemed in association with a purchase made by the gift recipient.

The following exemplary use case describes an examples of a typical user flow pattern. They are intended solely for explanatory purposes and not in limitation. A first person (the "gifter") may want to provide a gift to a friend (the "gift recipient") to a particular merchant, such as a particular restaurant. To create the gift, the gifter may open a mobile application (e.g., gift mobile application 402) on their smart phone (e.g., via user device 102) and use the mobile application to select the friend as the gift recipient. The gifter may specify which financial account they want to use to fund the gift ("gift account") by selecting, for example, a particular credit card account that is associated with their user account in the mobile application. The gifter may select or input a maximum amount of the gift, such as $50, and may designate other restrictions, such as for example, that the gift may only be redeemed at the specified restaurant. The gifter may also specify for example, that the gift may not be used until on or after the gift recipient's birthday, or that the gift must be used before a certain date or it will expire. After the user customizes the gift, the gifter's smart phone may send a notice to the system (e.g., gift application server 120) which may then create a tokenized PAN that corresponds to the selected gift account and may transmit the tokenized PAN to a mobile device associated with the gift recipient. The gift recipient may receive the tokenized PAN either through the mobile application or, if not registered with the mobile application, via a text message or email. The tokenized PAN may be stored in a digital wallet of the gift recipient's mobile device or may be stored as an image. The gift recipient may also receive a message providing details about the gift, such as who it is from, how much it is for, and what restrictions have been placed on the gift. In some instances, the gifter may designate a locking mechanism to be included with the gift, so that the gift recipient may have to, for example, solve a puzzle before being able to access the gift. The gift recipient may redeem the gift by using their digital wallet to process a payment based on the tokenized PAN using for example, near-field communication with a merchant POS device. When an attempted transaction is made, the merchant (e.g., merchant POS terminal 127) may send an authorization request to the system and the system (e.g., via transaction server 114) may authorize the transaction after determining that the tokenized PAN is being used in accordance with the associated restrictions. For example, before authorizing the transaction, the system (e.g., via transaction server 114) may determine that the merchant at which the attempted purchase is being made is the restaurant that was specified during the gift creation process. If an attempted purchase is made using the tokenized PAN at a restaurant that is not the restaurant specified during the gift creation process, the system will reject the transaction. Once the gift transaction is authorized, the system (e.g., via transaction server 114) will notify the merchant to allow the purchase and will cause the amount of the purchase to be debited to the credit card account of the gifter that was selected as the gift account, provided that the purchase amount is less than or equal to a remaining balance of the gift. In this way, the gifter may provide a customized gift to a friend, and will only be charged for the gift if and when it is actually used.

Although the above use case is described with respect to a gifter providing a gift to a gift recipient, other use cases are also contemplated. For example, the system described herein may be used in a manner similar to that described above by a parent to provide a child with money that is only to be used for a particular purpose (e.g., at a particular establishment during a particular time). The system described herein may also be used by an individual for managing personal spending. For example, a user may utilize the system to send themselves a gift to a particular store that has a maximum redemption value, such that the user may not spend more than the allotted amount at the store. The system may be used to send gifts to multiple people and may also be used by merchants or other organizations to send gifts to individuals. It should be understood that the example use cases provided herein are only exemplary and that many additional such uses are contemplated.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:

1. A method for providing an electronic item, comprising:
   receiving, from a first computing device associated with a first user, an electronic lock and the electronic item, wherein the electronic lock comprises a lock clue and a lock solution;
   transmitting, to a second computing device associated with a second user, the lock clue and an input field;
   causing the second computing device to display the lock clue and the input field;
   receiving, from the second computing device, an attempted lock solution;
   determining whether the attempted lock solution matches the lock solution;
   responsive to determining that the attempted lock solution does not match the lock solution:
      transmitting, to the first computing device, an unlock attempt notification comprising a failed unlock attempt indication;
      receiving, from the first computing device, a remote unlock instruction;
   responsive to receiving the remote unlock instruction, transmitting the electronic item to the second computing device for display, use, or both; and
   responsive to determining that the attempted lock solution matches the lock solution, transmitting the electronic item to the second computing device for display, use, or both by the second computing device.

2. The method of claim 1, wherein the electronic item is an image or a data file.

3. The method of claim 1, wherein the electronic item is a tokenized primary account number (PAN) or electronic gift card.

4. The method of claim 1, further comprising:
   responsive to determining that the attempted lock solution does not match the lock solution, transmitting a failure notification to the second computing device for display by the second computing device, wherein the failure notification comprises an indication that the attempted lock solution is incorrect.

5. The method of claim 1, wherein the unlock attempt notification, further comprises an indication of the attempted lock solution.

6. The method of claim 5, wherein the unlock attempt notification comprises an indication of a number of failed unlock attempts.

7. The method of claim 1, further comprising:
   receiving, from the first computing device, data representative of one or more unlock conditions; and
   prior to transmitting the electronic item to the second computing device, verifying that the one or more unlock conditions are satisfied.

8. The method of claim 7, wherein the one or more unlock conditions comprises an access date and verifying that the one or more unlock conditions are satisfied comprises determining that a current date is equal to or beyond the access date.

9. The method of claim 7, wherein the one or more unlock conditions comprises a maximum number of unlock attempts and verifying that the one or more unlock conditions are satisfied comprises determining that a number of attempted lock solutions received from the second computing device in relation to the electronic lock does not exceed the maximum number of unlock attempts.

10. The method of claim 7, wherein the one or more unlock conditions comprises a gift unlock location and verifying that the one or more unlock conditions are satisfied comprises determining, based on location data received from the second computing device, that the second computing device is within a predetermined proximity of the gift unlock location.

11. The method of claim 7, wherein the one or more unlock conditions comprises a gift unlock location, the method further comprising:
   receiving, from the second computing device in association with the attempted lock solution, an image obtained from an image capture device associated with the second computing device;
   identifying, using image recognition techniques, a landmark in the image; and
   wherein verifying that the one or more unlock conditions are satisfied comprises determining that the identified landmark is within a predetermined proximity of the gift unlock location.

12. The method of claim 1, further comprising:
   receiving, from the second computing device in association with the attempted lock solution, an indication of a positive identification of a user of the second computing device based on one or more of:
- a positive identification of a user's fingerprint via a fingerprint scanner associated with the second computing device;
- a positive identification of a user's face using image recognition techniques and based on an image obtained by an image capture device associated with the second computing device;
- a positive identification of a user's voice using voice recognition techniques and based on an audio recording obtained by a microphone associated with the second computing device; or
- a positive identification of a user's identity based on matching motion data obtained from a gyroscope associated with the second computing device to a stored gesture associated with authenticating the user's identity.

13. A method for providing an electronic item, comprising:
receiving, from a first computing device associated with a first user, a selection of an electronic lock and the electronic item, wherein the electronic lock comprises a lock clue and a lock solution;
transmitting, to a second computing device associated with a second user, the lock clue;
causing the second computing device to display the lock clue and an input field;
receiving, from the second computing device, an attempted lock solution;
determining whether the attempted lock solution matches the lock solution;
responsive to determining that the attempted lock solution does not match the lock solution:
  transmitting, to the first computing device, an unlock attempt notification comprising a failed unlock attempt indication;
  receiving, from the first computing device, a remote unlock instruction;
  responsive to receiving the remote unlock instruction, grant access to the electronic item to the second computing device; and
responsive to determining that the attempted lock solution matches the lock solution, grant access to the electronic item to the second computing device.

14. The method of claim 13, wherein the electronic item is an image or a data file.

15. The method of claim 13, wherein the electronic item is a tokenized primary account number (PAN) or electronic gift card.

16. The method of claim 13, further comprising:
responsive to determining that the attempted lock solution does not match the lock solution, transmitting a failure notification to the second computing device for display by the second computing device, wherein the failure notification comprises an indication that the attempted lock solution is incorrect.

17. A method for providing an electronic item, comprising:
receiving, from a first computing device associated with a first user, an electronic lock and the electronic item, wherein the electronic lock comprises a first lock clue and a lock solution;
transmitting, to a second computing device associated with a recipient, the first lock clue;
causing the second computing device to display the first lock clue and an answer input field;
receiving, from the second computing device, one or more attempted lock solutions via the answer input field;
responsive to determining that a first incorrect attempted lock solution of the one or more attempted lock solutions does not match the lock solution:
  transmitting a failed attempt notification to the first computing device;
  receiving, from the first computing device, a second lock clue;
  transmitting, to the second computing device, the second lock clue for display, use, or both; and
responsive to determining that one or more additional incorrect attempted lock solutions of the one or more attempted lock solutions do not match the lock solution:
  receiving, from the first computing device, a remote unlock instruction;
  transmitting, responsive to the remote unlock instruction, the electronic item to the second computing device for display, use, or both;
  causing the second computing device to display the electronic item; and
responsive to determining that a first correct attempted lock solution of the one or more attempted lock solutions matches the lock solution, transmitting the electronic item to the second computing device for display, use, or both.

18. The method of claim 17, wherein the electronic item is an electronic gift card and the second lock clue comprises a first set of alphanumeric characters corresponding to one or a plurality of words.

19. The method of claim 18, wherein the electronic gift card corresponds to the plurality of words formed by the first set of alphanumeric characters.

20. The method of claim 17, wherein the electronic item is configured to remain locked until the one or more additional incorrect attempted lock solutions reaches a predetermined minimum number of attempts.

* * * * *